United States Patent [19]

Zicker

[11] Patent Number: 5,247,564
[45] Date of Patent: Sep. 21, 1993

[54] ADAPTIVE VEHICLE ALARM DETECTION AND REPORTING SYSTEM

[75] Inventor: Robert G. Zicker, Houston, Tex.

[73] Assignee: GTE Mobile Communications Service Corp., Atlanta, Ga.

[21] Appl. No.: 603,815

[22] Filed: Oct. 24, 1990

[51] Int. Cl.[5] .................. H04M 11/04; H04M 11/00
[52] U.S. Cl. ..................................... 379/40; 379/39; 379/58; 379/59; 340/426; 340/430; 340/527; 340/528
[58] Field of Search ................. 379/40, 39, 41, 42, 379/44, 37, 58, 59, 102, 104, 105; 340/426, 527, 528; 430, 425.5, 428

[56] References Cited

U.S. PATENT DOCUMENTS

| | | |
|---|---|---|
| Re. 32,115 | 4/1986 | Lockwood et al. |
| 3,576,402 | 4/1971 | Baker |
| 4,233,473 | 11/1980 | Frost |
| 4,326,123 | 4/1982 | Hosterman |
| 4,399,330 | 8/1983 | Kuenzel |
| 4,411,017 | 10/1983 | Talbot |
| 4,439,636 | 3/1984 | Newkirk et al. |
| 4,517,412 | 5/1985 | Newkirk et al. |
| 4,549,308 | 10/1985 | LoPinto |
| 4,577,061 | 3/1986 | Katzeff et al. |
| 4,595,983 | 6/1986 | Gehalo et al. |
| 4,621,326 | 11/1986 | Rawlins |
| 4,625,276 | 11/1986 | Benton et al. |
| 4,646,343 | 2/1987 | Chen ........................... 379/40 |
| 4,675,863 | 6/1987 | Paneth et al. |
| 4,706,275 | 11/1987 | Kamil |
| 4,715,061 | 12/1987 | Norwich |
| 4,727,569 | 2/1988 | Kutrieb et al. |
| 4,731,818 | 3/1988 | Clark, Jr. et al. |
| 4,750,197 | 6/1988 | Denekamp et al. .......... 379/44 |
| 4,776,003 | 10/1988 | Harris |
| 4,777,646 | 10/1988 | Harris |
| 4,791,658 | 12/1988 | Simon et al. ................. 379/42 |
| 4,809,316 | 2/1989 | Namekawa ................... 379/44 |
| 4,821,309 | 4/1989 | Namekawa ................... 379/59 |
| 4,831,647 | 5/1989 | D'Avello et al. |
| 4,860,336 | 8/1989 | D'Avello et al. |
| 4,860,341 | 8/1989 | D'Avello et al. |
| 4,872,195 | 10/1989 | Leonard ....................... 379/41 |
| 4,897,630 | 1/1990 | Nykerk ......................... 379/40 |
| 4,904,983 | 2/1990 | Mitchell ....................... 340/426 |
| 4,910,493 | 3/1990 | Chambers et al. ........... 340/426 |
| 4,964,156 | 10/1990 | Blair ............................. 379/40 |
| 4,996,703 | 2/1991 | Gray ............................. 379/40 |
| 5,136,281 | 8/1992 | Bonaquist ..................... 379/42 |

OTHER PUBLICATIONS

"Stolen Vehicle Recovery" by Dan Sweeney, *Cellular Business*, Sep. 1990.

"Advanced Mobile Phone Service: Control Architecture" *The Bell System Technical Journal*, Jan. 1979.

*Primary Examiner*—Jin F. Ng
*Assistant Examiner*—Stella L. Woo
*Attorney, Agent, or Firm*—Lowell W. Gresham; Jordan M. Meschkow; Don J. Flickinger

[57] ABSTRACT

A cellular mobile radiotelephone (CMR 12) which detects and reports security breach conditions is disclosed. The CMR (12) includes a remotely programmable unit (RPU 48) in which alarm parameter data (1200) may be recorded from a remote programming (RP) host (22). An input (54) may be adapted to receive a vehicle alarm system (26) output. When the alarm system activates, a Mode 1 Alarm procedure (1700) is performed. If the alarm indication is deemed genuine, the CMR (12) automatically places a call to a security service (28). When a vehicle ignition signal (52) has just turned "on", a Mode 2 Alarm procedure (1800) is performed. A user is given a period of time, which is established remotely (1214), to enter a disarming code. If the disarming code is not entered in time, a genuine alarm event is assumed, and the CMR (12) places a call to the security service (28). In placing calls to the security service (28), numerous alarm parameters are established remotely. Thus, multiple call attempts to multiple telephone numbers (1216-1218), repeat call attempts for multiple iterations (1220), delays between call attempts (1222), diverse data formats (1224-1226), and multiple security breach reporting intervals (1228) are programmed remotely as needed to achieve a desired level of security protection.

12 Claims, 13 Drawing Sheets

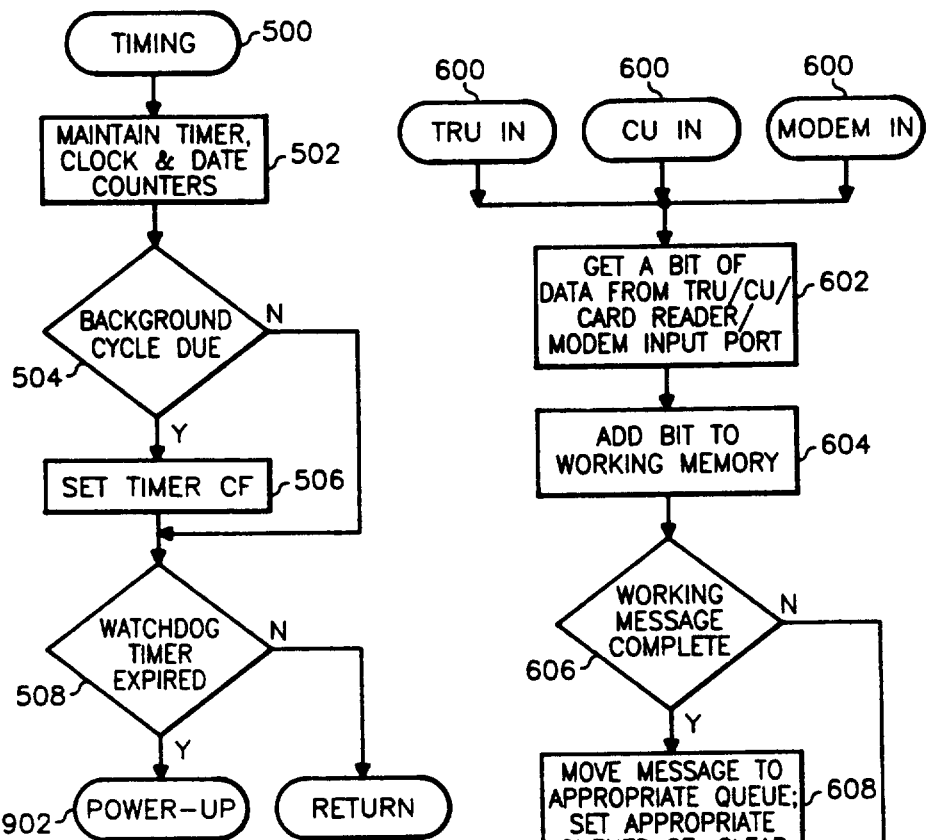
FIGURE 5
FIGURE 6
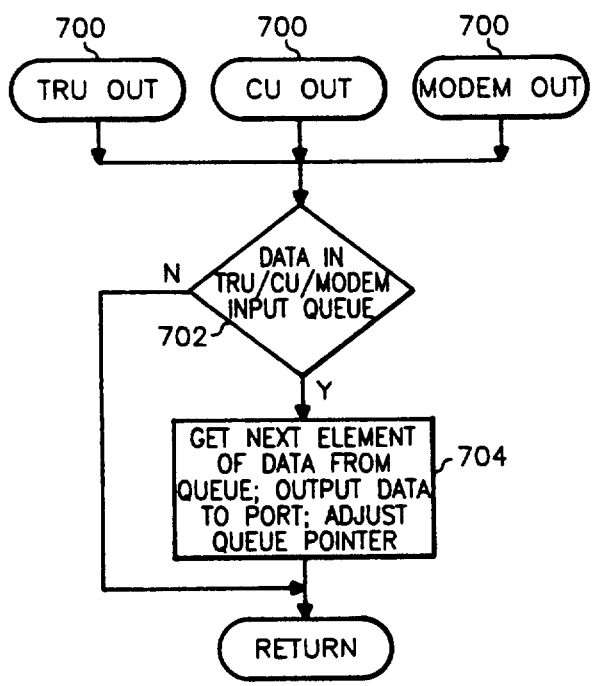
FIGURE 7
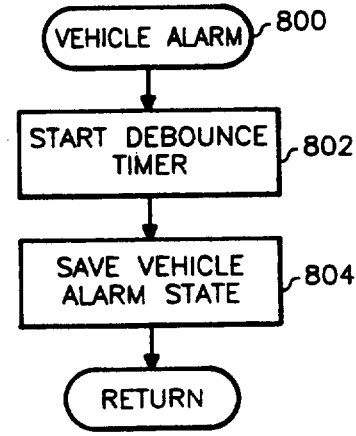
FIGURE 8

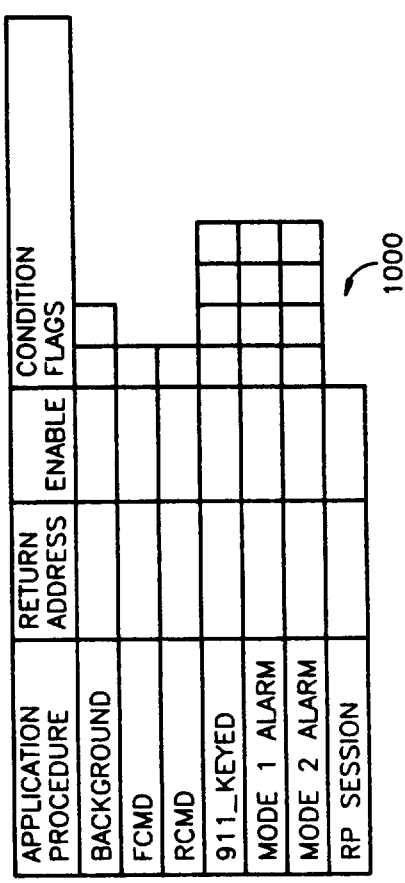
FIGURE 10
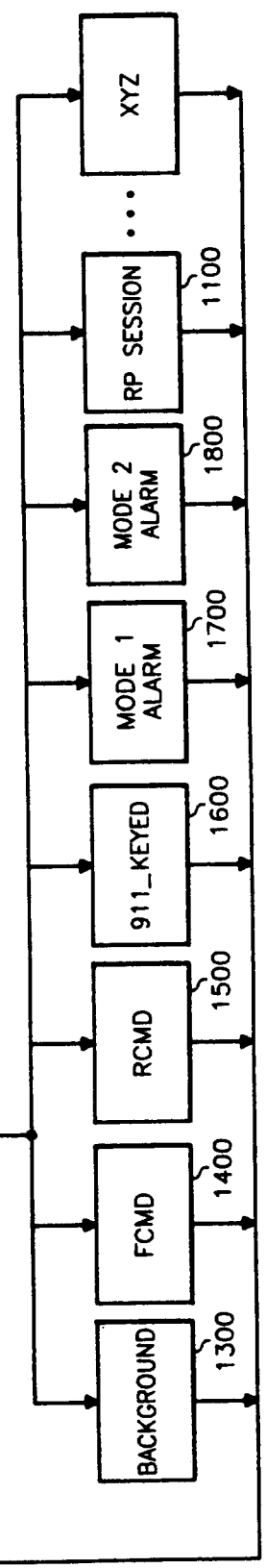
FIGURE 9
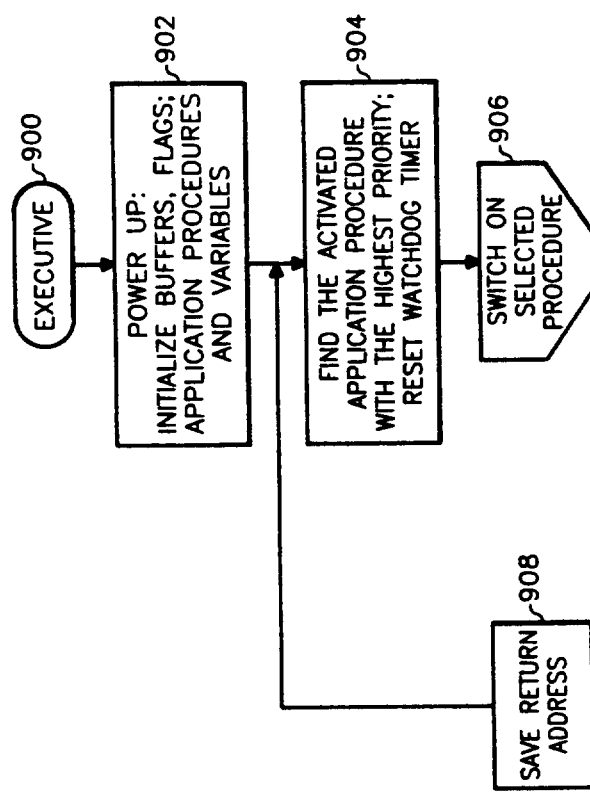

| MODE 1 | MODE 2 | |
|---|---|---|
| ACTIVATE | ACTIVATE | |
| ENABLE | ENABLE | ⌐1204 |
| 1212⌐ PRE-CALL WAIT | PRE-CALL WAIT | ⌐1214 |
| 1216⌐ FIRST CALL POINTER | FIRST CALL POINTER | ⌐1216 |
| 1216⌐ SECOND CALL POINTER | SECOND CALL POINTER | ⌐1216 |
| 1216⌐ THIRD CALL POINTER | THIRD CALL POINTER | ⌐1216 |
| 1226⌐ DTMF MESSAGE | DTMF MESSAGE | ⌐1226 |
| 1224⌐ DATA MESSAGE(S) | DATA MESSAGE(S) | ⌐1224 |
| 1208⌐ SIGNAL CHARACTERIZATION | | |

| |
|---|
| 1218⌐ PHONE NUMBER A |
| 1218⌐ PHONE NUMBER B |
| 1218⌐ PHONE NUMBER C |
| 1210⌐ VOICE CALL POINTER |
| 1220⌐ MAXIMUM NUMBER OF CALL ATTEMPTS PERMITTED |
| 1222⌐ INTERVAL BETWEEN REPEATING CALL ATTEMPTS |
| 1228⌐ INTERVAL BETWEEN ALARM REPORTS |
| DISARM CODE |
| 1206⌐ DISPLAY MESSAGES |
| RP PHONE NUMBER |
| 1202⌐ RP TIMING |
| ⋮ |
| EXECUTABLE CODE |
| ⋮ |

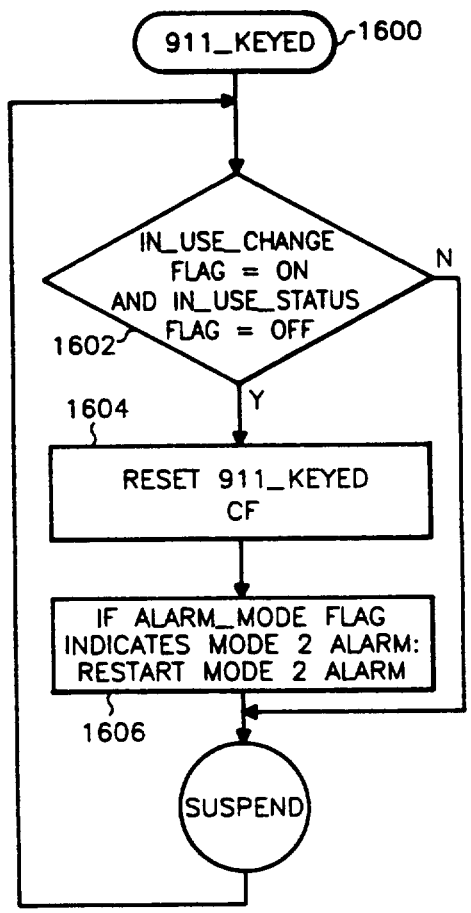 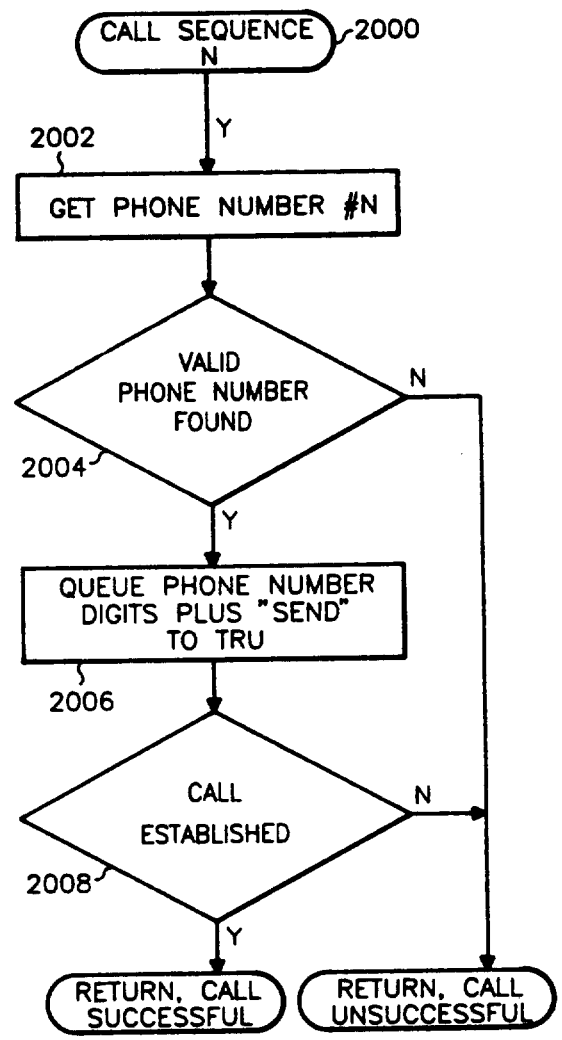
FIGURE 16
FIGURE 20

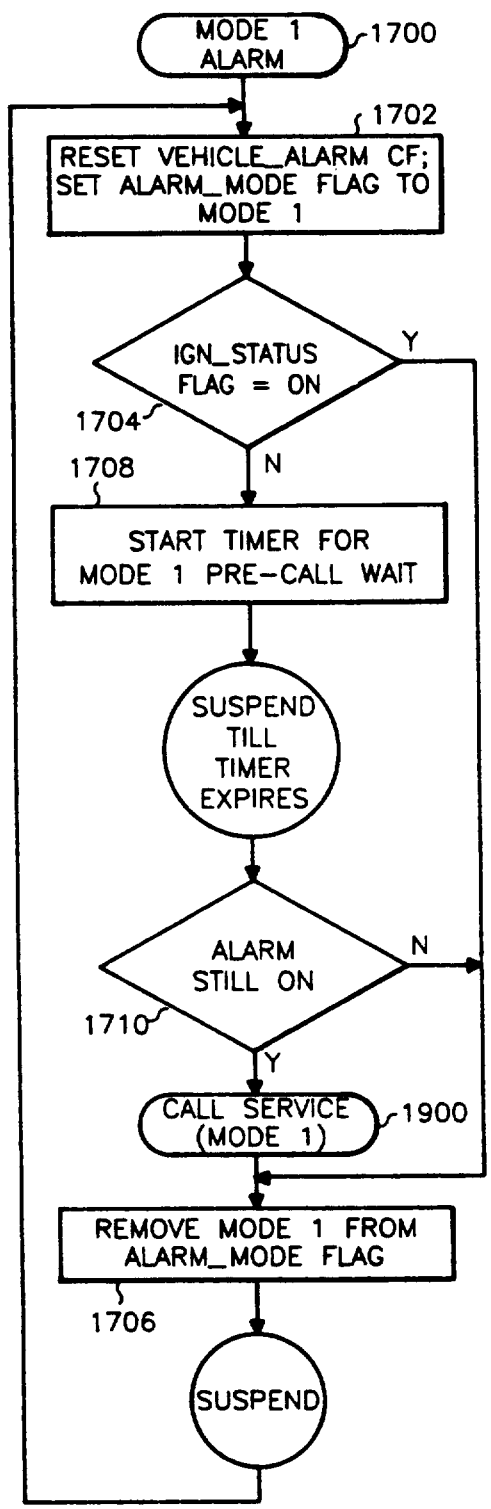
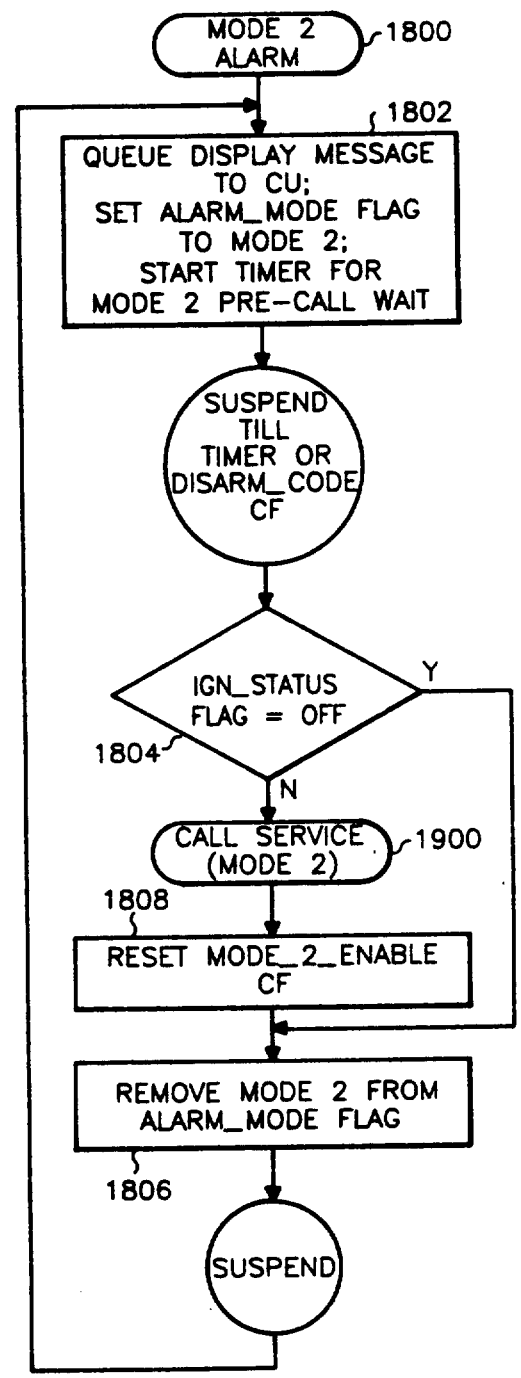
FIGURE 17
FIGURE 18

ADAPTIVE VEHICLE ALARM DETECTION AND REPORTING SYSTEM

RELATED PATENTS

The present invention is related to:
1. "Remote Accessing System for Cellular Telephones," by Robert G. Zicker, et al., Ser. No. 07/518,774, filed May 2, 1990, and assigned to the assignee of the present invention;
2. "Cellular Radiotelephone Credit Card Paystation Method," by Robert G. Zicker, et al., filed on the same day as the present application, and assigned to the assignee of the present invention; and
3. "Method of Selecting the Cellular System With Which a Cellular Mobile Radiotelephone Communicates," by Robert G. Zicker, filed on the same day as the present application, and assigned to the assignee of the present invention.

TECHNICAL FIELD OF THE INVENTION

The present invention relates generally to security and alarm equipment. More specifically, the present invention relates to cellular mobile radiotelephones configured to detect security breaches and to report such security breaches to a security service.

BACKGROUND OF THE INVENTION

An increased number of vehicle owners possess vehicles, particularly automobiles, that they value highly. At the same time, occurrences of vehicle theft and vandalizing are increasing; and, vehicle insurance rates are generally going up. Accordingly, many vehicle owners feel a need for an automobile alarm system to reduce the likelihood of theft and vandalization and to reduce insurance rates.

Numerous vehicle alarm systems are readily available. Typically, such systems incorporate various sensors which detect motion, presence, door openings, window openings, and the like. One or more of the sensors activates when a security breach occurs. When one of these sensors activates, an audible alarm sounds. Hopefully, the audible alarm will scare off a would-be thief or vandal and warn an owner, who may be nearby, of tampering with his or her vehicle.

Similar alarm systems are available for use in connection with buildings. In addition, building alarm systems often couple via phone lines to a security service. Such building-installed systems automatically call the security service when a security breach occurs. When the security service receives such a call, it takes steps to validate the alarm and notify appropriate parties, such as a police department, of the alarm. The validation steps may include calling building owners or managers to inquire if the reported security breach is a false alarm, and dispatching a patrol vehicle to investigate if necessary.

Persons who need vehicle alarms could benefit from some of the advantages achieved by automatically reporting a vehicle alarm to a security service. Furthermore, mobile cellular radiotelephones (CMRs) are becoming increasingly available and might be adapted to this purpose. However, CMRs represent complicated equipment, and their increasing availability is due, at least in part, to mass production techniques that reduce CMR costs. These same mass production techniques promote CMR standardization. In other words, in order to reduce CMR costs, enormous numbers of CMRs operate substantially the same way.

This standardization works against successfully adapting a CMR to report security breaches. Specifically, different security services have different procedures and requirements. For example, security services must work closely with police departments in their geographical area. Police departments typically require their local security services to adopt certain procedures for validating security breach reports before police departments are notified. Diverse police departments may require diverse procedures.

In addition, different security services may have different levels of technical capabilities. For example, security services with many clients, such as those in large metropolitan areas, may be able to dedicate phone lines and incorporate various computer systems into their operations to help manage incoming alarm-report response procedures. Such computer systems may have diverse technical reporting requirements. Furthermore, security services with few clients may not even be able to employ computers at all and still provide cost effective security services.

The standardization of CMRs presents further problems which work against successfully adapting a CMR to report security breaches. Specifically, individual clients of a security service may have different security needs. For example, a security service may provide different levels of security services to its clients for different prices. Lower level services may be designed to minimize the likelihood of false alarms. Thus, the cost of responding to false alarms is lower for the security service. Of course, a consequence of less-likely false alarms is that true alarms are more likely to be missed and responsive actions by the security service delayed. Higher level services may be designed to minimize the likelihood of missing true alarms or minimize delay in responding to alarms. As a consequence of this high-level service, more false alarms are to be expected, and the security service's costs of responding to these false alarms increase.

Accordingly, numerous programmable alarm parameters are needed to personalize each individual vehicle to each security service. While CMRs have been available which permit users and dealers to program various parameters of the CMR, this procedure is not practical for alarm parameters. Generally, the quantity of alarm parameters needed to personalize a CMR to accommodate numerous diverse services and individuals is too large for conventional user entry. Programming mistakes would be expected, and unreliable programming would result. Furthermore, the technical nature of the task would require an investment of great effort and time on the part of users or dealers in learning such parameters, their significance, their ranges, and how to program them. Extensive user and dealer frustration would be expected, and product dissatisfaction would result.

SUMMARY OF THE INVENTION

Accordingly, it is an advantage of the present invention that an improved cellular mobile radiotelephone (CMR) is provided which is capable of detecting and reporting security breaches.

Another advantage of the present invention is that alarm reporting CMRs are provided that are programmable so that they can be standardized for mass production and low cost, and yet they can accommodate great diversity in adapting individual user needs to individual security service requirements.

Yet another advantage is that the present invention provides an alarm reporting CMR in which numerous alarm parameters may be reliably specified without user or dealer involvement.

Still another advantage is that the present invention provides an alarm reporting CMR in which alarm parameters may be periodically and automatically altered to accommodate desired system or individual programming changes.

Another advantage is that the present invention provides an alarm reporting CMR which supports a wide range of choices in obtaining security services.

The above and other advantages of the present invention are carried out in one form by an improved method of operating a CMR to automatically report security breaches in accordance with requirements imposed by a security service. The method receives radio telecommunications data which adapt alarm parameters of the CMR to the security service. The CMR detects an activation event for the CMR, and then monitors user input to the CMR. The monitoring of user input is aimed at detecting the occurrence of a predetermined disarming signal, and this monitoring occurs during a predetermined disarming duration that begins substantially at the activation event. Unless the disarming signal is detected during the disarming duration, the method of the present invention causes a radiotelephone call to be placed to a telephone number defined by data obtained in the received radio telecommunications data.

The above and other advantages of the present invention are carried out in another form by an improved method of operating a CMR to automatically report security breaches with respect to a vehicle and in accordance with requirements imposed by a security service. The method receives radio telecommunications data which adapt alarm parameters of the CMR to the security service. An alarm signal from a vehicle alarm system is detected. This alarm signal indicates a security breach condition. The method then places a radiotelephone call to a telephone number defined by the data obtained in the received radio telecommunications data.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 5 shows a flow chart of a timing interrupt routine performed by the RPU portion of the present invention;

FIG. 6 shows a flow chart of data input interrupt routines performed by the RPU portion of the present invention;

FIG. 7 shows a flow chart of data output interrupt routines performed by the RPU portion of the present invention;

FIG. 8 shows a flow chart of a vehicle alarm input interrupt routine performed by the RPU portion of the present invention;

FIG. 9 shows a flow chart of an executive procedure performed by the RPU portion of the present invention;

FIG. 10 shows a diagram of a data structure used by the executive procedure in routing program control to various application procedures performed by the RPU portion of the present invention;

FIG. 12 shows a diagram of data elements within a memory space of the RPU portion of the present invention;

FIG. 16 shows a flow chart of a 911_Keyed application procedure performed by the RPU portion of the present invention;

FIG. 17 shows a flow chart of a Mode 1 Alarm application procedure performed by the RPU portion of the present invention;

FIG. 18 shows a flow chart of a Mode 2 Alarm application procedure performed by the RPU portion of the present invention;

FIG. 20 shows a Call Sequence routine utilized by the Call Service routine of the present invention.

DETAILED DESCRIPTION OF THE PREFERRED EMBODIMENT

Figure 1:
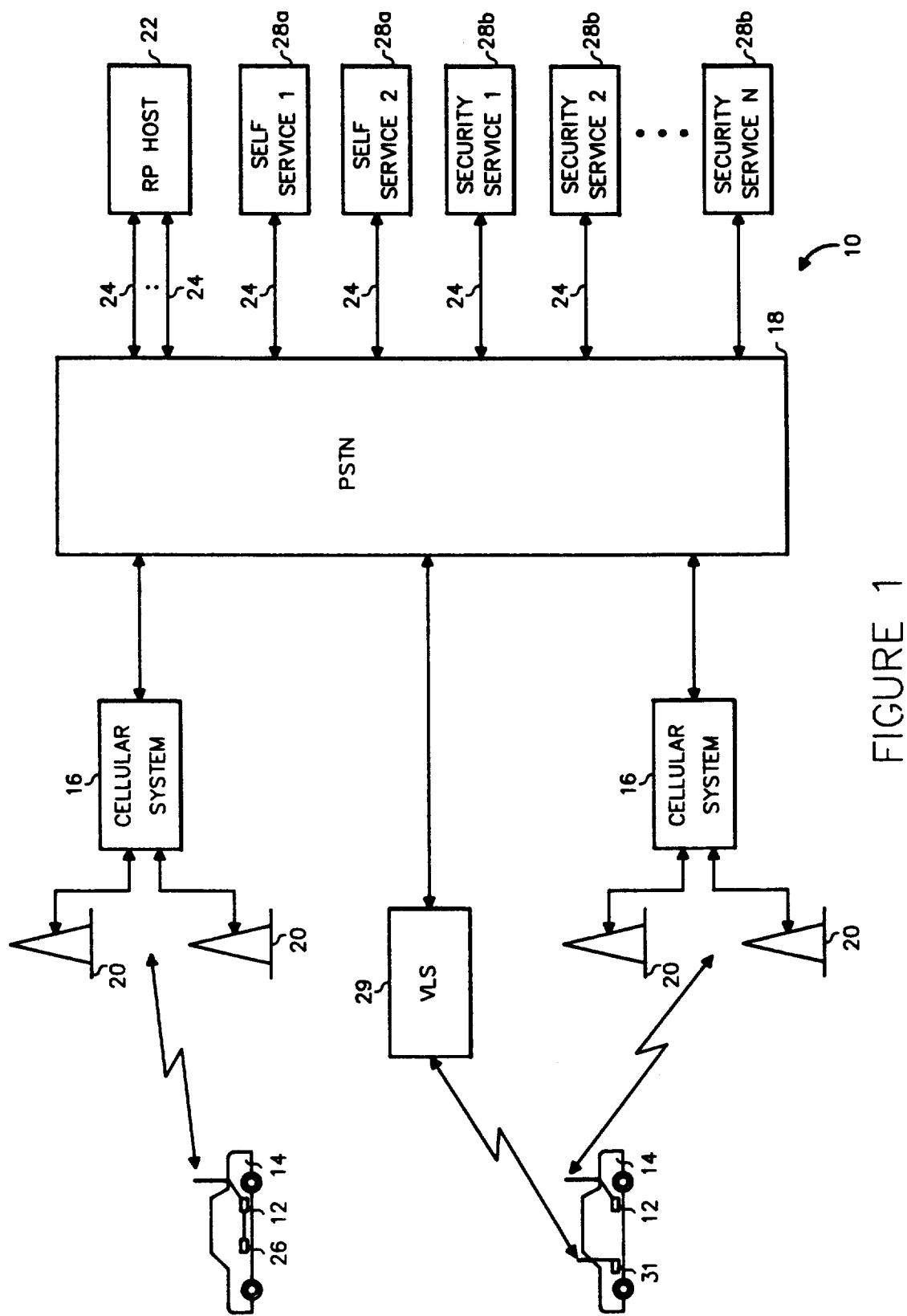
FIG. 1 shows a block diagram of an environment within which the present invention operates.

FIG. 1 shows a block diagram of an environment 10 within which the present invention operates. Environment 10 includes a multiplicity of cellular mobile radiotelephones (CMRs) 12 installed within vehicles 14. The precise number of CMRs 12 is not a critical feature and may range from a few to many tens of thousands. As is conventional, each of CMRs 12 is capable of communicating through cellular systems 16 to the public switched telecommunications network (PSTN) 18. Cellular systems 16 each include several spaced apart cells defined by antennas 20. PSTN 18 includes all the conventional cellular radio systems, cellular switching systems, trunks, satellites, and land-wired switching systems which are well known to those skilled in the art.

Environment 10 also includes a remote programming (RP) host 22, which couples to PSTN 18 through at least one, but preferably many, subscriber loops 24. RP host 22 is a computer system that remotely controls the programming of CMRs 12. Generally speaking, RP host 22 periodically engages in data communication sessions with CMRs 12. During such sessions RP host 22 and a CMR 12 exchange data. Thus, alarm parameters, data variables, timing data, predetermined telephone numbers, modes of operation flags, virtually any item of application data, and executable machine code utilized within CMR 12 may be altered as a result of such sessions. Specific details of a preferred implementation of remote programming host 22 and its relation to remotely accessible cellular radiotelephones are provided in the above-listed related patent references.

Vehicles 14 may, but need not, include a conventional vehicle alarm system 26. When a vehicle alarm system 26 is installed within vehicle 14, it is coupled to a corresponding CMR 12. When vehicle alarm system 26 detects a security breach in a conventional manner, a vehicle alarm signal is sent to CMR 12. CMR 12 recognizes this alarm signal and performs what is described herein as a Mode 1 Alarm procedure (discussed below), to place a call to a telephone number stored within CMR 12. Since numerous types of suitable conventional vehicle alarm systems 26 are known to those skilled in the art, systems 26 are not discussed in detail herein.

CMR 12 may additionally detect a security breach without receiving an input signal from vehicle alarm system 26. In accordance with the system and method of the present invention, CMR 12 performs what is described herein as a Mode 2 Alarm procedure (discussed below) to detect and report security breaches to the same or a different telephone number called in the Mode 1 Alarm procedure.

The telephone numbers are stored in the CMR during a remote programming session with RP host 22. Moreover, these telephone numbers represent the telephone numbers of security services 28, which are coupled to PSTN 18 through one or more subscriber loops 24. For the purposes of the present invention a security service 28 is any person, organization, entity, or device coupled to PSTN 18 for the purpose, at least in part, of taking actions to resolve security breaches reported through a phone call.

Security services 28 include self service providers 28a and security service providers 28b. Self service providers 28a are typically individual vehicle owners. Thus, the phone numbers for self service providers 28a may advantageously be assigned to an individual's pager, work phone, home phone, data communication equipment, or the like. Security service providers 28b include individual organizations whose purpose, at least in part, is to work closely with local police departments and manage security for many clients by verifying security breach reports, passing verified security breach reports to police departments, and locating stolen vehicles. Their phone numbers may be assigned to organization phones, data communication equipment, computers, and the like.

Generally speaking, when a security service 28 receives a call from a CMR 12 reporting a security breach, the call transmits data identifying the calling CMR 12 or individual with whom the calling CMR 12 is associated. The identification data additionally indicates the fact that the incoming call is reporting a security breach as opposed to another type of call. Using this identification data, security service 28 typically takes actions to validate the security breach report. For self service providers 28a, such actions may include immediately going to the vehicle 14 to verify its presence and state of well being. If the vehicle is missing or vandalized, the self service provider 28a may immediately make a report to his or her local police department and/or insurance company. Accordingly, a vehicle's owner need not be within audible range of his or her vehicle 14 to hear an alarm activate, but can receive this information through PSTN 18. For security service providers 28b, such actions may first include a call to the CMR 12 which reported the security breach. If this call is not successful, a list of phone numbers kept on file may be called to locate the vehicle owner or others that can help in locating and inspecting vehicle 14 to validate the alarm report.

When a vehicle 14 cannot be located or an alarm report is validated as a stolen vehicle, the security service 28 may notify appropriate authorities, such as a police department. Security service 28b may additionally either incorporate a vehicle locating system (VLS) host 29 or contact host 29 through PSTN 18. When the missing vehicle 14 is equipped with a VLS transponder 31, VLS host 29 can interrogate transponder 31 to locate vehicle 14. Accordingly, stolen or otherwise unlocated vehicles 14 may be quickly and precisely located. Conventional vehicle location systems are contemplated for use within environment 10. An example of one such system is commercially available from the METS Corporation of Indianapolis, Ind. While VLS transponder 31 provides security benefits, the present invention does not require transponder 31 and provides other security benefits when transponder 31 is not installed within vehicle 14.

Figure 2:
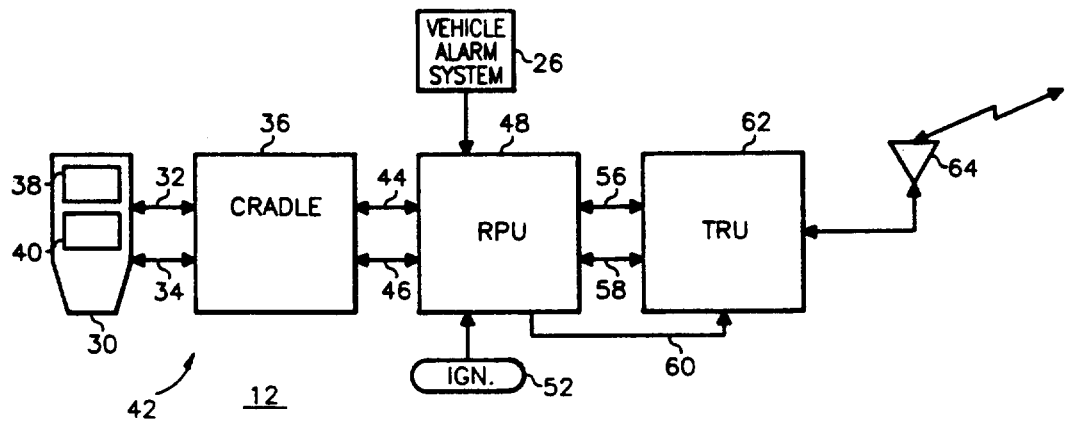
FIG. 2 shows a block diagram of a cellular mobile radiotelephone (CMR) used in connection with the system of the present invention.

FIG. 2 shows a block diagram of a preferred CMR 12 used in connection with system 10. CMR 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. An ignition input to RPU 48 couples to an ignition terminal 52 of an automobile in which CMR 12 is installed. In addition, vehicle alarm system 26, discussed above in connection with FIG. 1, provides signals which are received by RPU 48. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is conventional, an antenna 64 through which TRU 62 communicates with antennae 20 (see FIG. 1) also couples to TRU 62. Accordingly, RPU 48 may represent a kit which is installed between a conventional CU 42 and a conventional TRU 62 of a conventional CMR. The use of conventional CMR equipment as a platform to which remote programmability hardware is added reduces costs due to the mass production of such conventional equipment. Preferably, RPU 48 is physically mounted on CU 42.

Figure 3:
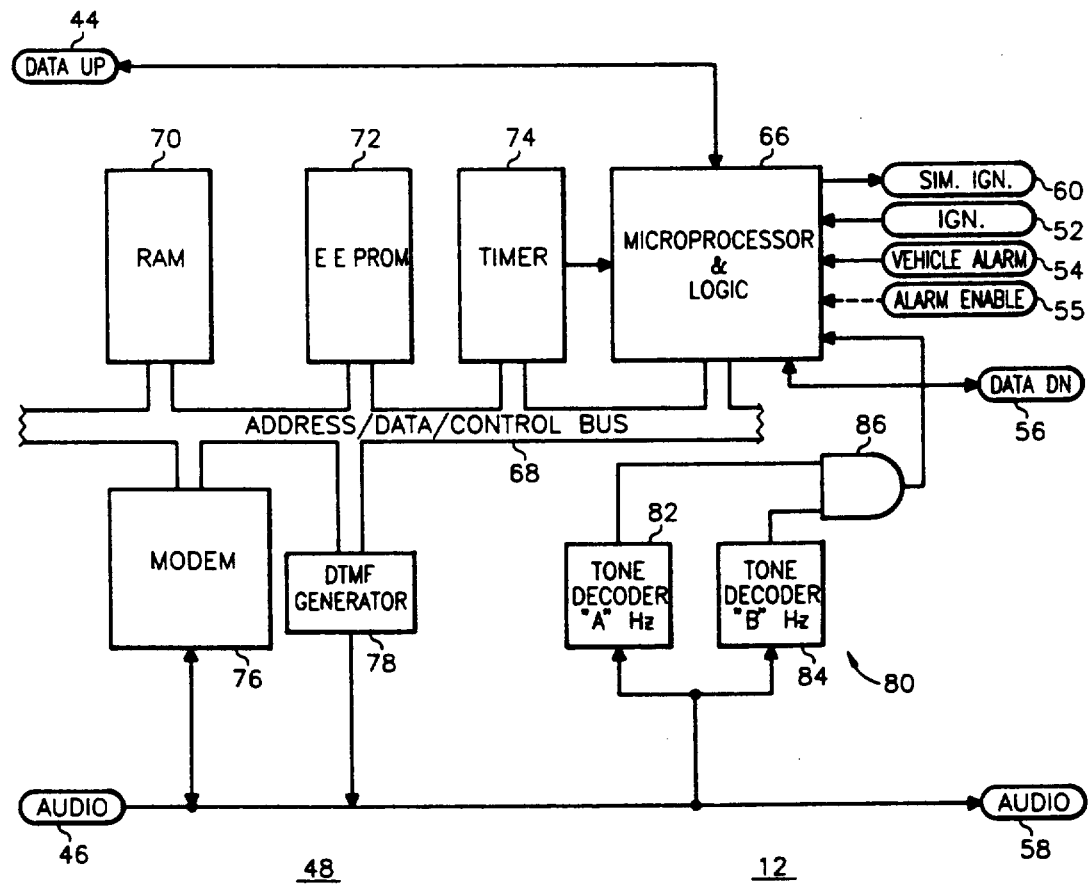
FIG. 3 shows a block diagram of a remotely programmable unit (RPU) portion of the CMR of the present invention.

FIG. 3 presents a block diagram of hardware included in a preferred RPU 48. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, a data port of a modem 76, and a control port of a dual tone multifrequency (DTMF) generator 78. Those skilled in the art will understand that RAM 70 is one example of a volatile read-write type of memory, and battery-backed-up RAM and other memory devices may serve as non-volatile read-write memory 72. An audio port of modem 76 and an audio port of DTMF generator 78 are additionally coupled to audio bus 58, and timer 74 preferably is coupled to an interrupt input of section 66.

Microprocessor and logic section 66 generally controls the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which CMR 12 is installed is "off".

Modem 76 represents a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detect, and ring detect are communicated to and from microprocessor section 66 through bus 68.

Likewise, DTMF generator 78 represents a conventional DTMF generator. Thus, conventional DTMF tones are placed on audio bus 58 in response to control codes supplied to DTMF generator 78 from microprocessor section 66.

Section 66 senses the state of ignition signal 52, a vehicle alarm signal 54, and an optional alarm enable signal 55. Signals 54 and 55 are generated by vehicle alarm system 26 (see FIGS. 1-2). Vehicle alarm signal 54 activates when vehicle alarm system 26 detects a security breach. Alarm enable signal 55 activates to indicate that vehicle alarm system 26 is armed so that it may signal a security breach condition should one occur.

In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Section 66 also provides a control output bit, which is coupled to simulated ignition signal 60. The conventional TRU 62 (see FIG. 2) senses this simulated ignition signal in lieu of ignition signal 52, that it Would otherwise sense in a conventional CMR installation. When the simulated ignition signal is set or active, TRU 62 and CU 42 become energized. Simulated ignition signal 60 responds to the state of ignition signal 52, to the date and time data maintained in conjunction with timer 74, and to the vehicle alarm signal 54. Hence, RPU 48 causes conventional TRU 62 to alter its conventional operation in accordance with the present invention, discussed below.

Signal detection circuit 80 is configured to detect a predetermined login audio tone. In the preferred embodiment, this login tone includes two predetermined frequencies, labeled as "A" and "B" in FIG. 3. Frequencies A and B are selected so that the login tone is as unique as possible within normal telecommunication. In other words, the login tone is unlikely to be present during normal telecommunication operations, other than in a login procedure, an example of which is discussed in the above-listed related patents.

The present invention is embodied, at least in part, within RPU 48. As discussed above, CU 42 and TRU 62 (see FIG. 2) are provided by conventional non-remotely programmable cellular radiotelephone equipment. Specifically, in the preferred embodiment, a cellular telephone manufactured by the OKI Corporation as model EM-23 serves as CU 42 and TRU 62. Generally speaking, microprocessor and logic section 66 of RPU 48 practices this method by executing programming instructions stored in memories 70-72. This method of the present invention involves, at least in part, the processing of data to control the operation of environment 10 (see FIG. 1). Some of the specific processing tasks performed by the preferred embodiment are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Figure 4:
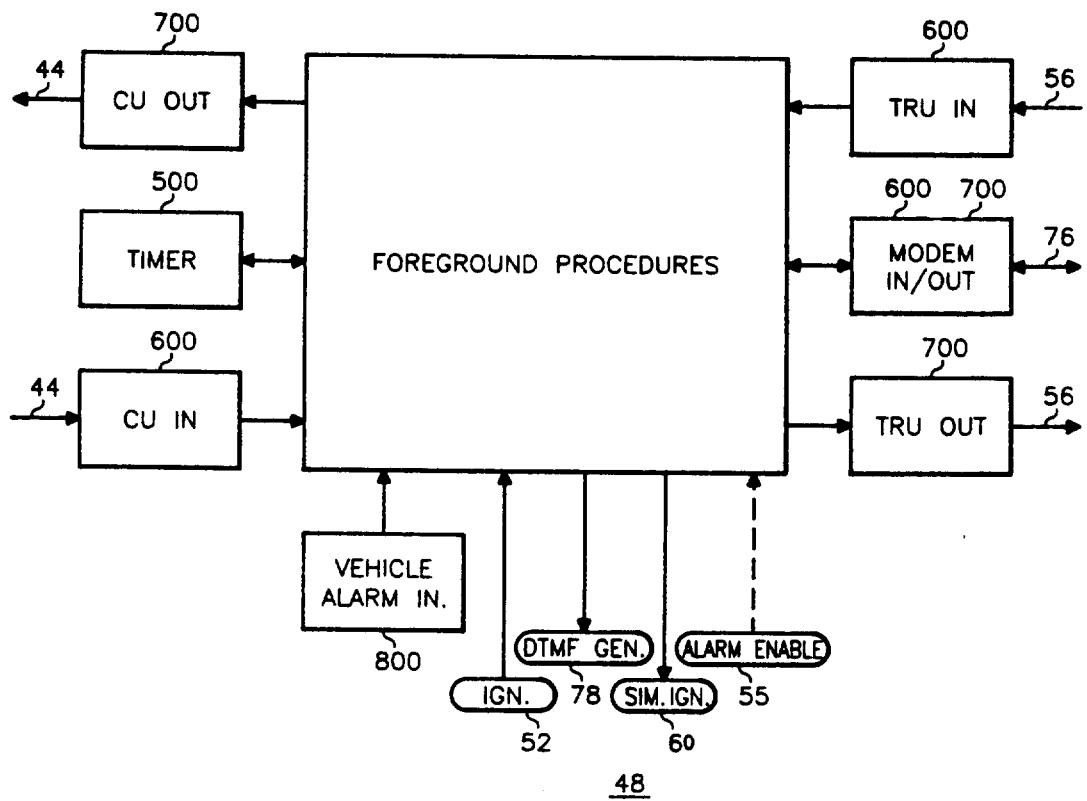
FIG. 4 shows a block diagram of data flow into and out from the RPU portion of the present invention.

With respect to the data processing performed by RPU 48, FIG. 4 shows a block diagram of data flow into and out of RPU 48. Generally speaking, the flow of this data is controlled by various background software procedures.

RPU 48 receives data concerning date and time through the operation of a timer background procedure 500, which is described in more detail below in connection with FIG. 5.

Input background procedures serve to manage the reception of serial data from serial data busses 44 and 56, and through modem 76. The input background procedures generally place data received at RPU 48 into appropriate queues so that they may be processed by various foreground software procedures, which are discussed below in connection with FIGS. 9-20. As shown in FIG. 4, there are three input background interrupt procedures: CU-In, TRU-In, and Modem-In. All three procedures operate similarly. Thus, to show these various data input roles, a generic input background procedure 600 is discussed below in connection with FIG. 6.

Likewise, output background procedures coordinate the transmission of data on data busses 44 and 56 and through modem 76. The output background procedures retrieve data placed in their queues by the various foreground software procedures and cause the data to be transmitted at an appropriate port. The three output background procedures CU-Out, TRU-Out, and Modem-Out shown in FIG. 4 are similar to one another. Thus, to show these various data output roles, a generic background data output interrupt procedure 700, is discussed below in connection with FIG. 7.

In the preferred embodiment, vehicle alarm signal 54 is processed through a vehicle alarm input interrupt routine 800, discussed below in connection with FIG. 8.

In addition, foreground procedures monitor ignition input signal 52 and set or reset the output signal which serves as simulated ignition signal 60. Moreover, such procedures monitor optional alarm enable signal 55 and control the transmission of DTMF tones by DTMF generator 78.

Background timing procedure 500, shown in FIG. 5, is performed by microprocessor section 66 and timer 74 of RPU 48 (see FIG. 3) in response to an interrupt generated by timer 74. This interrupt occurs on a regular basis, such as once every few milliseconds. As shown in a task 502, timing procedure 500 maintains timer, clock, alarm, and date counters so they remain current. As discussed above, even when vehicle ignition is "off", microprocessor section 66 and timer 74 remain energized so that the timers, clocks, and date counters operate even when TRU 62 and other portions of CMR 12 (see FIG. 2) are de-energized.

An inquiry task 504 of procedure 500 inquires whether the clock counter contains a value which indicates that a background application procedure 1300 (discussed below in connection with FIG. 13) should be activated. Background application procedure 1300 is actually a foreground procedure which is used to perform tasks similar to those performed in background procedures. In the preferred embodiment, procedure 1300 is activated once every several milliseconds, at a rate which is considerably slower than the performance of timing procedure 500. When the cycle for background application procedure 1300 is due, a task 506 sets a Timer condition flag (CF). The method of the present invention uses numerous condition flags, and the discussion below refers to such condition flags by the acronym "CF". The timer CF eventually causes the foreground procedures to perform procedure 1300, in a manner discussed below in connection with FIGS. 9-10.

Procedure 500 additionally includes an inquiry task 508, which monitors the one of its counters that is serving as a watchdog timer. If this counter has reached a predetermined value, a catastrophic type of timeout condition has occurred. When this happens, program control is transferred to a power-up task 902, discussed below in connection with FIG. 9. However, so long as this watchdog timer has not expired, timing procedure 500 returns to the procedure being executed when the timer interrupt was initially received.

As discussed above, background input data procedure 600, flow chart shown in FIG. 6, illustrates the tasks used by each of CU-In, TRU-In, and Modem-In procedures shown in FIG. 4. Procedure 600 is invoked whenever a bit (or byte in the case of the Modem-In procedure) of data has been received. A task 602 gets a bit of data from an appropriate input port. For the CU-In procedure, this input port is the one coupled to serial data bus 44 (see FIG. 4); for the TRU-In procedure, the input port is the one coupled to serial data bus 56; and, for the Modem-In procedure, the input port is the one coupled to Modem 76 (see FIG. 3).

After task 602, a task 604 adds the bit or byte of received data to a working message, and an inquiry task 606 determines whether the working message is complete. When the received data is an entire byte of data, the message may be complete upon each reception. However, when data is received one bit at a time, the bits are collected until an entire message has been received. When the working message is not yet complete, data input procedure 600 simply causes program control to return to the procedure that was being executed when procedure 600 was initially invoked.

On the other hand, when task 606 discovers that the working message is complete, a task 608 moves the completed message to an appropriate queue and clears the working message to make buffer space for a subsequent input. For CU-In and TRU-In procedures, the message-receiving queues are input queues for forward command (FCMD) and reverse command (RCMD) application procedures 1400 and 1500, respectively. FCMD and RCMD application procedures 1400 and 1500 are discussed below in connection with FIGS. 14 and 15, respectively. Along with moving the completed message to an appropriate queue, task 608 also sets appropriate condition flags (CFs) to signal the presence of the input message. For CU-In and TRU-In procedures, RCMD_Queued and FCMD_Queued CFs, respectively, are set. For the Modem-In procedure, a Modem_Queued CF is set.

As discussed above, background output data procedure 700, flow chart shown in FIG. 7, illustrates the tasks used by each of CU-Out, TRU-Out, and Modem-Out procedures. Procedure 700 is invoked whenever a bit (or byte in the case of the Modem-Out procedure) is ready for output. The preferred embodiment of the present invention invokes CU-Out and TRU-Out procedures once every 800 microseconds, and this rate is determined from a timing signal mixed with data presented on serial data busses 44 and 56. Accordingly, data transmissions among TRU 62, RPU 48, and CU 42 remain synchronized with one another.

In an inquiry task 702, procedure 700 determines whether data is present in the appropriate input queue for procedure 700. If data is available, a task 704 removes the next data element (either a bit or a byte) from the queue and outputs the data element to the appropriate port. Of course queue pointers and data element counters are adjusted so that the subsequent data element will be output next and so that freed up queue space may be utilized for receiving additional data. After task 704 and when task 702 determines that no data is available in its queue for output, procedure 700 causes program control to return to the procedure that was being executed when procedure 700 was initially invoked.

FIG. 8 shows a flow chart for Vehicle Alarm interrupt routine 800. Routine 800 is performed whenever vehicle alarm signal 54 from vehicle alarm system 26 (see FIGS. 1-3) initially activates. A task 802 starts a debounce timer which may advantageously be set for 30-40 milliseconds. A task 804 saves the current state of vehicle alarm signal 54. After tasks 802 and 804, routine 800 causes program control to return to the procedure that was being executed when routine 800 was initially invoked. At this point, CMR 12 takes no other action with respect to the detected activation of vehicle alarm signal 54. Rather, the signal is first debounced through the operation of background procedure 1300, discussed below in connection with FIG. 13.

As discussed above, FIGS. 9-20 present information related to foreground procedures performed by the present invention. Generally speaking, these foreground procedures consist of several application procedures that are managed by an executive 900. FIG. 9 shows a flow chart of executive 900. The application procedures are configured so that once they are invoked, they relinquish control back to executive 900 within a short period of time, whether or not they have completed their execution. Executive 900 then determines which of the application procedures is activated for execution and which has the highest priority among those that are activated. Of course, the background procedures discussed above may be invoked at any time during operation of executive 900 or during operation of the application procedures.

With reference to FIG. 9, executive 900 includes the power-up task 902 that was discussed above in connection with FIG. 5. Task 902 initializes the operation of RPU 48. This initialization includes the resetting of condition and other flags, the disabling of alarms and timers, the clearing of buffers, and the initialization of variables. After task 902, a task 904 resets the watchdog timer. In resetting the watchdog timer, program control must return to task 904 prior to expiration of the watchdog timer or timer procedure 500 (see FIG. 5) will force a power-up reset to occur. Task 904 also determines which of the application procedures is activated, and of those which are activated, which one has the highest priority.

Executive 900 constructs and maintains a data structure 1000, which is illustrated in FIG. 10, to aid in making this determination. Data structure 1000 includes several data elements associated with each of the application procedures. One data element is used to indicate the address at which program control should be routed when the application is next invoked. During the power-up initialization of task 902, these addresses are set to the respective beginnings of the application procedures. However, during operation of the present invention, they may change as the application procedures are performed. Another data element indicates whether the application procedure is enabled. If an application procedure is disabled, it cannot be considered activated. However, if an application procedure is enabled, it is considered activated only when at least one of the associated condition flags (CFs) are set. Additional flags may also be included to indicate whether particular condition flags are enabled so that they may be considered, or not. Accordingly, data structure 1000 also associates an identification of various condition flags with each application procedure.

The data elements in data structure 1000 may advantageously be arranged so that a prioritization scheme is implied. Thus, task 904 of executive 900 may simply examine the "enable" and "condition flag" data elements in a predetermined order wherein the first activated application procedure encountered automatically has a higher priority than all other activated application procedures. As shown in switching task 906, program control is then switched to the selected application procedure at the address associated in data structure 1000 with the selected application procedure.

Executive 900 may route program control to any one of: 1) background procedure 1300, 2) FCMD procedure 1400, 3) RCMD procedure 1500, 4) 911_Keyed procedure 1600, 5) Mode 1 Alarm procedure 1700, 6) Mode 2 Alarm procedure 1800, 7) RP session procedure 1100, or other application procedures which are not related to the present invention. Each of these procedures returns program control to executive 900. Upon return, a task 908 saves an appropriate return address of the previously invoked procedure at the appropriate location within data structure 1000.

As discussed below in connection with background application procedure 1300 (see FIG. 13), RPU 48 monitors current time to detect when to engage in a remote programming session. In addition, remote programming sessions may occur at other times when RP host 22 (see FIG. 1) may place a call to CMR 12. When these events occur, RP session procedure 1100 becomes activated. As a result of activating RP session procedure 1100, executive 900 (see FIGS. 9-10) routes program control to RP session procedure 1100 as soon as possible.

Figure 11:
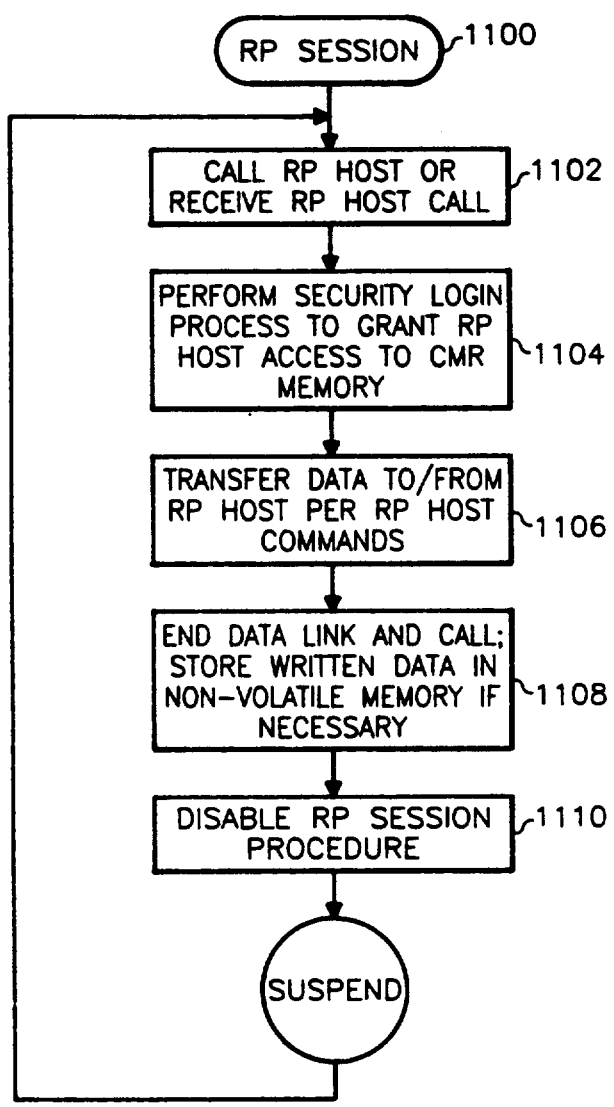
FIG. 11 shows a flow chart of a remote programming (RP) session application procedure performed by the RPU portion of the present invention.

FIG. 11 shows a flow chart of tasks performed within RP session procedure 1100. In a task 1102, CMR 12 establishes a call with RP host 22 (see FIG. 1). RPU 48 may apply power to TRU 62 prior to establishing the call if necessary by activating simulated ignition output signal 60 (see FIGS. 2-3). As discussed in the above-listed related patents, this call may be placed by CMR 12 and answered by RP host 22 or placed by RP host 22 and answered by CMR 12. After task 1102, a task 1104 performs a security login process. This login process preferably requires RP host 22 to generate the unique dual tone login signal discussed above in connection with FIG. 3 and to provide CMR 12 with a password before CMR 12 will grant access to its memory space. During the login process, CMR 12 transfers its electronic serial number (ESN) to RP host 22 for use in generating the password. Accordingly, each CMR 12 has its own unique password that is preferably known only to RP host 22. Once RP host 22 logs into CMR 12, RP host 22 has access to a memory space 1200 (see FIG. 12) of CMR 12. Memory space 1200 is maintained within memories 70-72 (see FIG. 3). FIG. 12 presents a chart of many of the data elements and alarm parameters that are controlled within memory space 1200 through an RP session.

Next, a task 1106 causes CMR 12 to perform data transfer operations to or from RP host 22 in accordance with commands issued from RP host 22. The data transfer operations take place through the Modem-In and Modem-Out procedures discussed above in connection with FIGS. 6 and 7, respectively. Thus, RP host 22 may read memory locations within CMR 12 and may write data to memory locations within CMR 12, including the alarm parameters and other data elements listed in FIG. 12. After task 1106, a task 1108 ends the session with RP host 22, drops the call, and stores any data within non-volatile memory 72 (see FIG. 3) which may require data storage action. After task 1108, a task 1110 disables RP session procedure 1100 so that it will not be invoked again until its next scheduled time. After task 1110, procedure 1100 suspends operation and program control returns to executive 900 (see FIG. 9). RP session procedure 1100 will not be invoked again until the next time it is activated. Upon the next return to procedure 1100, program control will resume with task 1102, discussed above.

Figure 13:
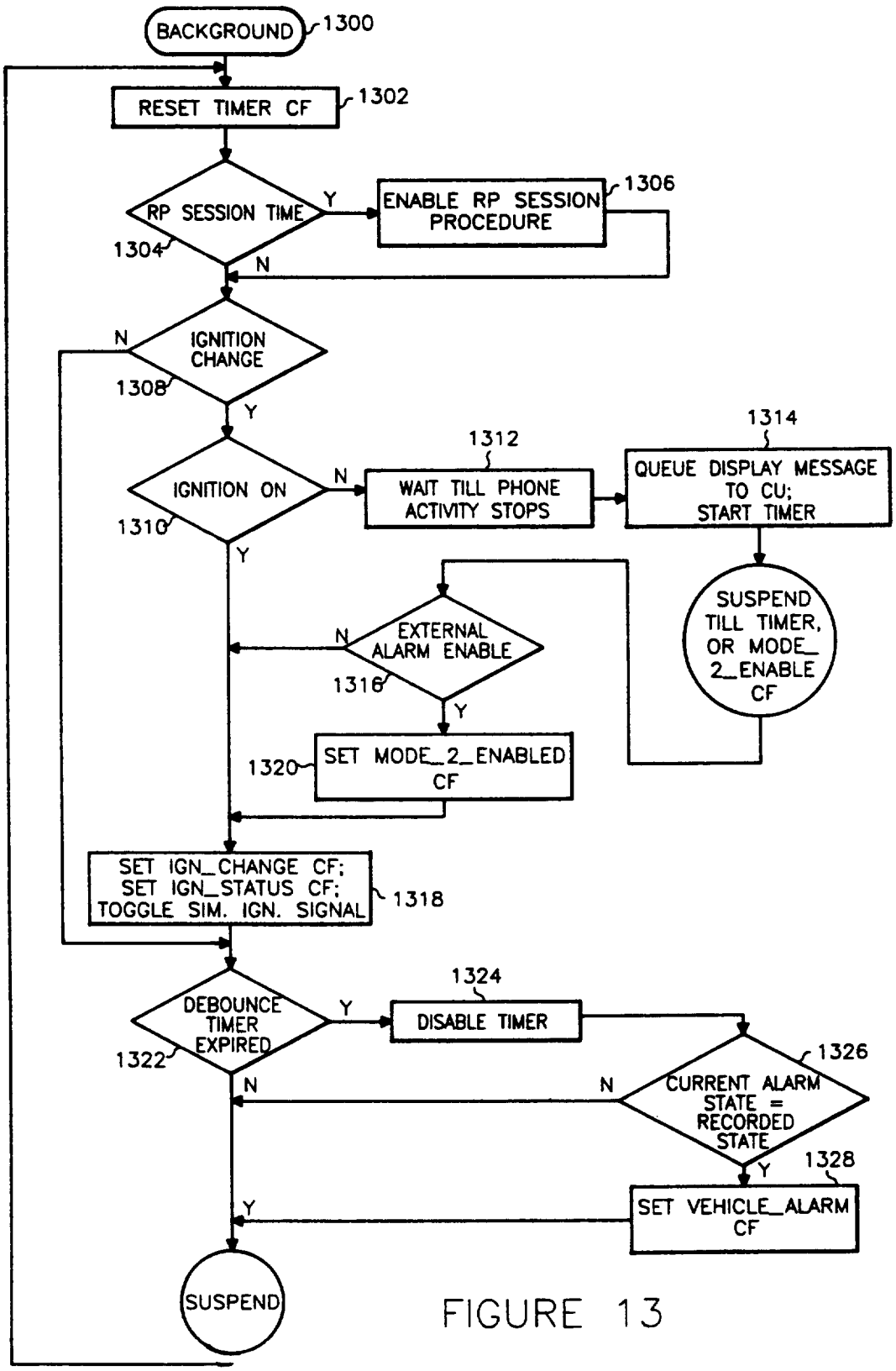
FIG. 13 shows a flow chart of a background application procedure performed by the RPU portion of the present invention.

FIG. 13 shows a flow chart of background application procedure 1300. As mentioned above, background application procedure 1300 performs tasks similar to tasks performed by the background procedures discussed above in connection with FIGS. 5-8. Such tasks relate to the monitoring of timing and external inputs.

With reference to FIG. 13, a task 1302 resets the timer CF. As discussed above in connection with FIG. 5, the timer CF was set when timer procedure 500 determined that it was time to activate background application procedure 1300. This condition was signalled by setting the Timer CF. Upon power-up, data structure 1000 (see FIG. 10) was modified to indicate that background application procedure 1300 was enabled. Thus, when the Timer CF was set, executive 900 (see FIG. 9) caused program control to switch to procedure 1300. By resetting the Timer CF in task 1302, procedure 1300 will not be again invoked until the next time procedure 500 determines that it should be invoked.

Procedure 1300 additionally includes an inquiry task 1304 that determines whether it is time to engage in a remote programming session. Remote programming sessions occur on a periodic basis in a manner determined by programming within memory 72 of RPU 48 (see FIG. 2). In particular, RP timing data 1202 of data structure 1200 (see FIG. 12) defines the timing of the periodic remote programming sessions. Generally speaking, task 1304 compares the current date and time, maintained by timer procedure 500, with a stored value. If the current date and time equals or exceeds the stored value, a task 1306 activates RP session application procedure 1100 (see FIG. 11) by setting the appropriate enabling data element in data structure 1000 (see FIG. 10).

After task 1306 or when task 1304 determines that it is not now time for an RP session, an inquiry task 1308 determines whether the ignition of the vehicle has recently changed states. This determination may be performed by comparing an ignition status flag with the current ignition signal 52 (see FIGS. 2-4). The ignition status flag records a previously detected ignition state, and if ignition signal 52 differs from this recorded state, then a change has occurred. When an ignition change has occurred, an inquiry task 1310 determines whether the new state is the "on" state. If the "on" state is not detected, procedure 1300 is halted or suspended in a task 1312 until all telephone activity, which may be in progress ends.

As discussed above, the present invention causes CMR 12 to perform Mode 1 and Mode 2 Alarm procedures. The Mode 1 Alarm procedure results from detecting activation of vehicle alarm signal 54 (see FIGS. 3-4). The Mode 2 Alarm procedure results from the activation of vehicle ignition. As will be discussed below in more detail, the Mode 2 Alarm procedure detects a security breach condition in addition to reporting the security breach condition. Specifically, a security breach is detected when the Mode 2 procedure is activated and a user fails to enter a disarming code prior to the expiration of a disarming duration. This disarming duration begins when RPU 48 detects an ignition change to an "on" state. However, CMR 12 automatically disables the Mode 2 procedure unless a user has previously taken specific actions to enable it prior to switching vehicle ignition "on".

After task 1312, procedure 1300 performs tasks which allows a user to enable the Mode 2 procedure. When enabled, data element 1204 of memory structure 1200 (see FIG. 12) and an appropriate enabling element of data structure 1000 (see FIG. 10) are set. Under normal conditions, the Mode 2 procedure is disabled when a task 1314 is performed. Task 1314 queues a message obtained from data elements 1206 of memory structure 1200 (see FIG. 12) for display at CU 42. This message prompts a user to enable the Mode 2 procedure by pressing appropriate keys on keypad 40 (see FIG. 2).

In addition, task 1314 starts a timer which will expire after a predetermined duration. After task 1314, procedure 1300 suspends operation and returns program control to executive 900. Executive 900 then switches program control to another application procedure in accordance with data structure 1000 (see FIG. 10). When the timer started in task 1314 eventually expires or when the Mode_2_Enable CF becomes set as a result of the user pressing the appropriate keys of keypad 40, executive 900 routes program control back to background procedure 1300 at an inquiry task 1316.

Task 1316 determines whether optional alarm enable signal 55 (see FIGS. 3-4) is active. The active state of signal 55, whether active high, active low, or off, may be defined by signal characterization data element 1208 of memory structure 1200 (see FIG. 12). If task 1316 determines that the external alarm is not enabled, program control proceeds to a task 1318. However, if the external alarm is enabled, then a task 1320 sets the Mode_2_Enabled CF before transferring program control to task 1318. This permits a user to enable the Mode 2 Alarm procedure through a remote control alarm activator (not shown). Accordingly, the Mode 2 Alarm procedure may be enabled either through user input at keypad 40 or through an external alarm system's remote control.

Task 1318 is performed both when ignition "on" occurs and when ignition "off" occurs. Task 1318 sets an Ign_Change CF and an Ign_Status CF to indicate the change in ignition and the new status of the ignition, respectively. The Ign_Change CF and the Ign_Status CF are associated with Mode 2 Alarm procedure 1800 (see FIG. 18) in data structure 1000 (see FIG. 10). They instruct executive 900 (see FIG. 9) to invoke procedure 1800 when the ignition "on" condition occurs. Additionally, task 1318 toggles simulated ignition signal 60 so that the energized state of TRU 62 and CU 42 matches the vehicle ignition. In other words, when vehicle ignition is on, the entire CMR 12 is energized, and when vehicle ignition is off, task 1318 de-energizes TRU 62 and CU 42, leaving RPU 48 (see FIGS. 2-3) energized.

After task 1318 or when task 1308 determines that no ignition change has occurred, an inquiry task 1322 examines the debounce timer which might have been started in response to an external alarm signal, as discussed above in task 802 of FIG. 8. If this timer has been enabled and has expired, then a task 1324 disables the timer. After task 1324, an inquiry task 1326 compares the current state of vehicle alarm signal 54 with the state previously recorded in task 804 of FIG. 8. When the current and recorded alarm states are not the same, procedure 1300 takes no action and CMR 12 ignores any alarm signal previously received in task 802. In this situation, CMR 12 assumes that the alarm signal resulted from noise, switch bounce, or another anomaly. On the other hand, when task 1326 determines that the current and recorded state for the external alarm signal match, CMR 12 assumes that the alarm signal is genuine, and a task 1328 sets a Vehicle_Alarm CF. The Vehicle_Alarm CF is associated with Mode 1 Alarm procedure 1700 within data structure 1000 (see FIGS. 9-10) and instructs executive 900 to invoke Mode 1 Alarm procedure 1700 as soon as possible.

After tasks 1322, 1326, and 1328, procedure 1300 suspends operation and program control returns to executive 900 (see FIG. 9). Background application procedure 1300 will not be invoked again until the next time Timer CF is set. Upon the next return to procedure 1300, program control will resume with task 1302, discussed above.

Figure 14:
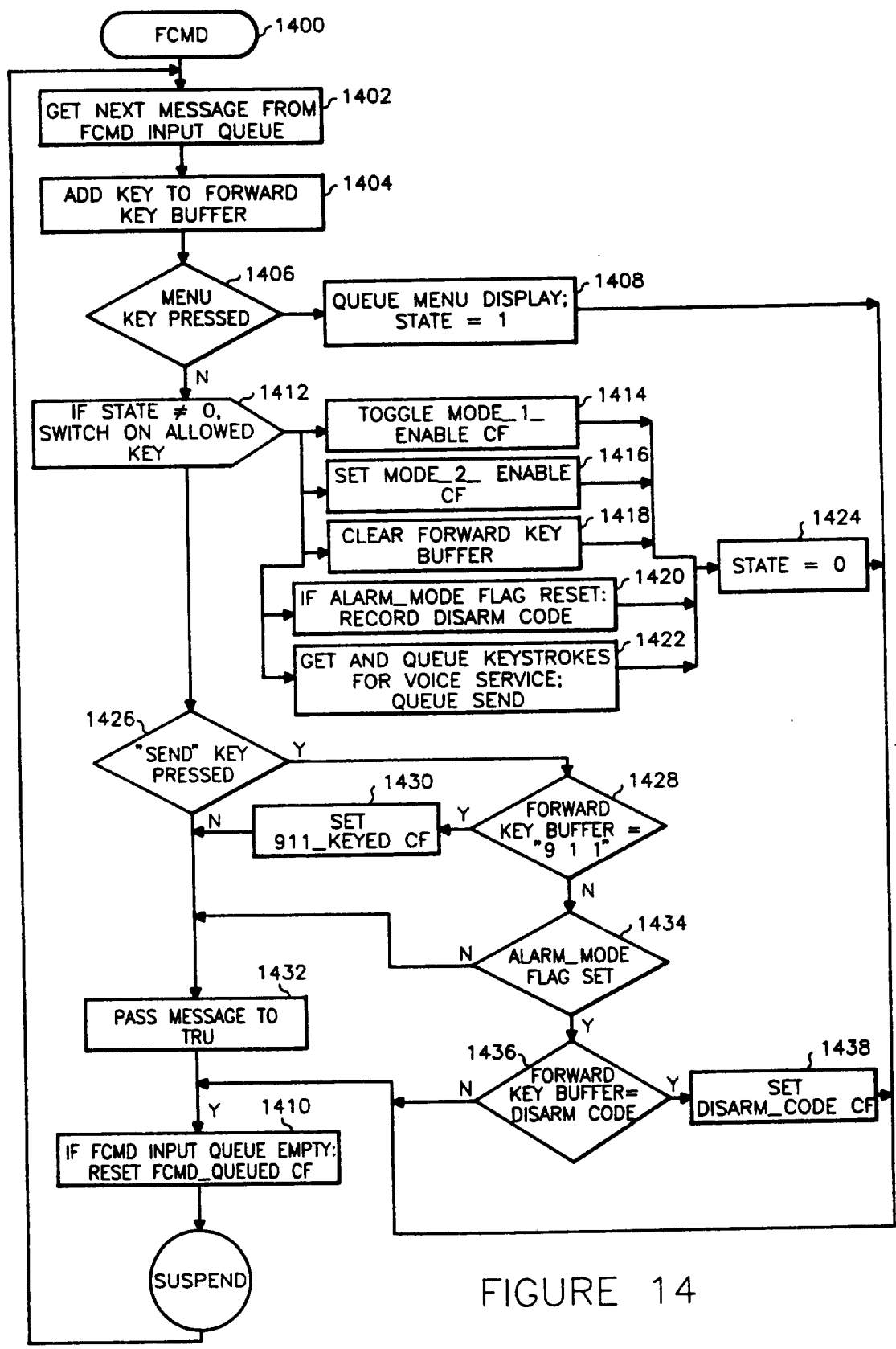
FIG. 14 shows a flow chart of a forward command (FCMD) application procedure performed by the RPU portion of the present invention.

FIG. 14 shows a flow chart of tasks performed within forward command (FCMD) application procedure 1400. FCMD procedure 1400 is performed when a message is received from CU 42 (see FIG. 2) and processed through the CU-In background procedure, discussed above in connection with FIG. 6. Generally speaking, FCMD procedure 1400 processes data messages traveling from CU 42 toward TRU 62 (see FIG. 2). These data messages generally communicate the fact that a key on keypad 40 (see FIG. 2) has been pressed and identify the pressed key. Based on this processing, data in various buffers and various condition flags are maintained in a current form. In addition, FCMD procedure 1400 decides whether or not to pass such messages on to TRU 62.

With reference to FIG. 14, a task 1402 of FCMD procedure 1400 gets the next message present in its input queue. This message was placed there by background data input procedure 600, as discussed above in connection with FIG. 6. Next, a task 1404 adds data identifying the pressed key to a forward key buffer. After task 1404, an inquiry task 1406 determines whether the message being processed indicates the pressing of a "menu" key. When the menu key has been pressed, a task 1408 queues a message (see data element 1206 of FIG. 12) for output to CU 42 and sets a State variable to an initial value, such as one. The message prompts the user to press one of a plurality of keys to cause CMR 12 to alter its programming or take some other action. After task 1408, a task 1410 updates the FCMD_Queued CF, which controls the invoking of FCMD procedure 1400. Specifically, when the FCMD input queue is empty, indicating that no more input messages are present for FCMD procedure 1400 to process, the FCMD_Queued CF is reset so that procedure 1400 will not be invoked again until such messages are present. Next, procedure 1400 is suspended, and program control returns to executive 900 (see FIG. 9). Program control returns to task 1402, discussed above, to process the next message received from CU 42.

One of the keys identified in the message displayed in task 1408 may be associated with programming alarms. Alternatively, a user may be asked to cycle through multiple levels of menus to reach the level that programs alarms. When multiple levels of menus are utilized, additional tasks (not shown) may, when the state variable does not equal zero, alter the State variable to another non-zero value and queue other menu display messages for display at CU 42.

Eventually, a series of key presses causes the State variable to indicate that the program alarms menu level has been reached. When this level is reached, a switching task 1412 switches program control to a task that is selected in accordance with the key that was just pressed. Specifically, a first key press will cause task 1412 to switch program control to a task 1414, which toggles the Mode_1_Enable CF. This CF cause executive 900 to invoke Mode 1 Alarm procedure 1700 (see FIG. 9). If the Mode_1_Enable CF was originally set, task 1414 resets it, and if the Mode_1_Enable CF was originally reset, task 1414 sets it.

A second key press causes task 1412 to switch program control to a task 1416. Task 1416 sets the Mode_2_Enable CF, discussed above in connection with background application procedure 1300. A third key press causes a task 1418 to clear the forward key buffer. This identifies subsequent keystrokes as being associated with a new disarming code. The disarming code is used by CMR 12 to prevent the reporting of alarms to security service 28 (see FIG. 1). A fourth key press causes a task 1420 to record the key-presses saved in the forward key buffer as the disarming code. However, task 1420 refrains from recording a new disarming code when an Alarm_Mode flag is set. The Alarm_Mode flag is set when CMR 12 is in the process of responding to a security breach condition. Thus, once a security breach condition has been detected and is being processed, the disarming code cannot be changed.

A fifth key press causes a task 1422 to automatically dial the security service 28 so that a voice conversation may take place. Specifically, task 1422 retrieves a telephone number by getting the telephone number indicated by a Voice Call Pointer data element 1210 of memory space 1200 (see FIG. 12). This phone number may, but need not, be one of the telephone numbers that CMR 12 calls to report alarms. This telephone number is queued for output to TRU 62 and followed by a simulated "send" keypress so that TRU 62 will place the call.

After each of tasks 1414–1422, a task 1424 resets the State variable to zero to indicate the end of menu sequences. After task 1424, task 1410 updates the FCMD_Queued CF, and FCMD procedure 1400 suspends operation until another input message is available for processing.

When FCMD procedure 1400 is processing a message which is not a part of the above-discussed menu sequence, as indicated by the State variable being equal to zero, program control is routed to an inquiry task 1426. Task 1426 determines whether the message indicates that a "send" key of keypad 40 has been pressed. When the "send" key is pressed, an inquiry task 1428 examines the above-discussed forward key buffer to see if the send key followed the digits "9-1-1." If a "send" followed a "911", then a task 1430 sets a 911_Keyed CF. Those skilled in the art will appreciate that the 911 telephone number represents an emergency number. The present invention permits placing 911 emergency calls even though cellular radiotelephone service may be otherwise blocked, as discussed below.

If a send message followed the 911 digits, or if the message being processed by FCMD procedure 1400 is not a send message, a task 1432 passes the message through to TRU 62. Messages are passed to TRU 62 by placing them in an input queue for the TRU-Out procedure discussed above in connection with FIG. 7. When a 911 call is being requested, the passing of the send message to TRU 62 will cause the call to be placed. After task 1432, task 1410 updates the FCMD_Queued CF, and FCMD procedure 1400 suspends operation until another input message is available for processing.

On the other hand, when a send message does not follow the 911 digits, additional investigation takes place before deciding whether to pass the send message on to TRU 62. Specifically, an inquiry task 1434 determines whether an Alarm_Mode flag is set. The Alarm_Mode flag is set by Mode 1 and Mode 2 Alarm procedures 1700 and 1800 (see FIGS. 9 and 17-18) to indicate that a security breach has been detected and that CMR 12 is processing the security breach condition. While processing the security breach condition, CMR 12 simulates a de-energized state. Thus, CMR 12 appears to be unavailable for operation to a user and yet does not indicate that alarm reporting calls are being placed to service 28. When task 1434 determines that the Alarm_Mode flag is reset, CMR 12 assumes that messages may be passed to TRU 62, and program control proceeds from task 1434 to task 1432, discussed above.

However, when the Alarm_Mode flag is set, an inquiry task 1436 examines the forward key buffer to see if it contains the disarming code, discussed above. When the disarming code is not present in the forward key buffer but the Alarm_Mode flag is set, messages are not passed to TRU 62, and program control is routed from task 1436 to task 1410, discussed above. Since send messages are blocked from TRU 62, user input at CU 42 will not interfere with automatic operation of CMR 12 to report security breaches to service 28. When task 1436 discovers that the forward key buffer contains the disarming code, a task 1438 sets a Disarm_Code CF to indicate the fact that the disarming code has been entered at CU 42 by a user. After task 1438, procedure 1400 performs task 1410, discussed above, without passing the send message through to TRU 62.

Figure 15:
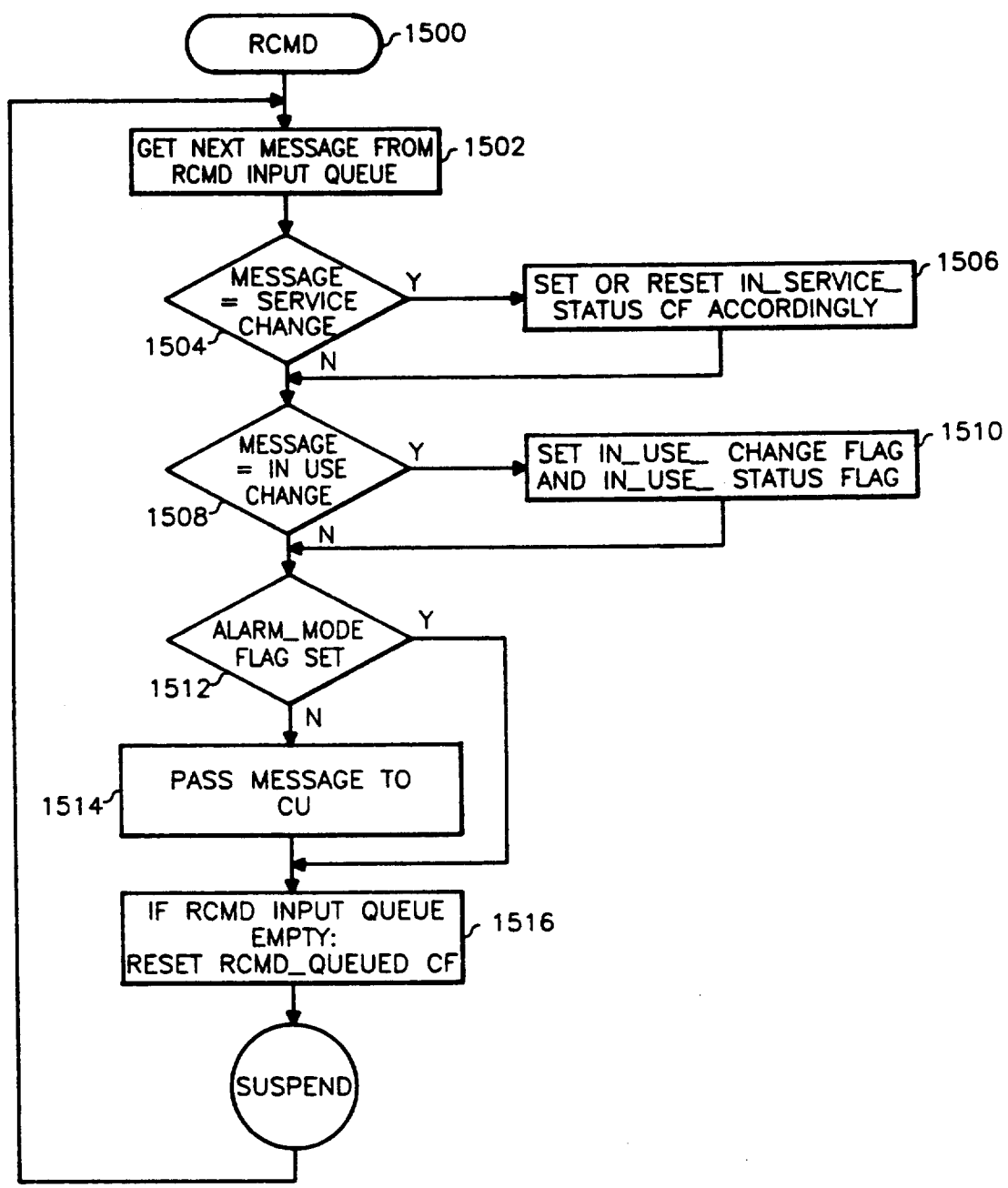
FIG. 15 shows a flow chart of a reverse command (RCMD) application procedure performed by the RPU portion of the present invention.

FIG. 15 shows a flow chart of tasks performed within reverse command (RCMD) application procedure 1500. RCMD procedure 1500 is performed when a message is received from TRU 62 (see FIG. 2) and processed through background procedure 600, discussed above in connection with FIG. 6. Generally speaking, RCMD procedure 1500 processes data messages traveling from TRU 62 toward CU 42 (see FIG. 2). Based on this processing, various condition flags are maintained in a current form. In addition, RCMD procedure 1500 decides whether or not to pass such messages on to CU 42.

With reference to FIG. 15 a task 1502 of RCMD procedure 1500 gets the next message present in its input queue. This message was placed there by the TRU-In background data input procedure discussed above in connection with FIG. 6. Next, an inquiry task 1504 examines this message to determine if it indicates a change in service. The change in service may be among a no service condition, which indicates that no cellular system 16 (see FIG. 1) is within radio range of CMR 12, home, and roaming services. When a service change message is detected in task 1504, a task 1506 sets or resets an In_Service_Status CF accordingly. In other words, the In_Service_Status CF indicates whether or not cellular radiotelephone service is available to CMR 12.

After task 1506 or when task 1504 determines that the message being processed is not a service change message, an inquiry task 1508 examines the message to determine if it indicates a change in CMR usage. When such a change occurs, a task 1510 sets an In_Use_Change flag to indicate that usage of CMR 12 has changed. In addition, task 1510 sets or resets an In_Use_Status flag to indicate whether CMR 12 is now in use or not in use, respectively.

After task 1510 or when task 1508 determines that the message being processed is not a usage change message, an inquiry task 1512 examines the Alarm_Mode flag to see whether it is set. If the Alarm_Mode flag is not set, a task 1514 passes the message on to CU 42. This message is passed by adding the message to the input queue for the background data output procedure that transmits data to CU 42, discussed above in connection with FIG. 7. However, when the Alarm_Mode flag is set, the message is not passed to CU 42. Accordingly, messages sent from TRU 62 toward CU 42 do not reach CU 42 when CMR 12 is processing a detected security breach condition.

After task 1514 or when task 1512 finds the Alarm_Mode flag set, a task 1516 updates the RCMD_Queued CF, which controls the invoking of RCMD procedure 1500. Specifically, when the RCMD input queue is empty, indicating that no more input messages are present for RCMD procedure 1500 to process, the RCMD_Queued CF is reset so that RCMD procedure 1500 will not be invoked again until such messages are present. Next, procedure 1500 is suspended and program control returns to executive 900 (see FIG. 9).

As discussed above, FCMD procedure 1400 (see FIG. 14) sets the 911_Keyed CF when it determines that a 911 call has been keyed into CU 42. The "send" message is passed through to TRU 62, and TRU 62 places the 911 call. When the 911_Keyed CF is set, executive 900 routes program control to 911_Keyed procedure 1600 (see FIGS. 9-10).

FIG. 16 shows a flow chart of 911_Keyed procedure 1600. In procedure 1600 an inquiry task 1602 examines the state of the In_Use_Change and the In_Use_ Status flags, which are controlled in task 1510, discussed above in connection with RCMD procedure 1500 (see FIG. 15). Unless the In_Use_Change flag is set and the In_Use_Status flag indicates no use, procedure 1600 suspends operation, and program control returns to executive 900. The 911_Keyed CF has not been reset, and executive 900 will route program control back to 911_Keyed procedure 1600 as soon as possible. Thus, a loop is formed in which program control is continually routed back to task 1602 until the In_Use_Change flag is set and the In_Use_Status flag indicates no use.

The In_Use_Change and In_Use_Status flags are appropriately set to route program control from task 1602 to a task 1604 when the previously placed 911 call finishes. Task 1604 resets the 911_Keyed CF so that procedure 1600 will not be invoked again until the next 911 call. Next, a task 1606 restarts Mode 2 Alarm procedure 1800 (see FIGS. 9 and 18) when the Alarm_Mode flag indicates activation of the Mode 2 alarm procedure.

Thus, the present invention permits a 911 call to be placed in lieu of entering an expected disarming code that would, if promptly entered, stop Mode 2 Alarm procedure 1800 from placing a security breach report call to service 28 (see FIG. 1). Preferably, 911_Keyed procedure 1600 has a higher priority than Mode 2 Alarm procedure 1800 so that executive 900 will not route program control to procedure 1800 while a 911 call is in progress. However, procedure 1800 may have already started and set certain timers (discussed below). Thus, task 1606 disables all timers used by procedure 1800 and resets the return address for procedure 1800 within data structure 1000 (see FIG. 10) so that the next time executive 900 invokes procedure 1800, procedure 1800 will begin execution at its beginning. As a result, after completion of a 911 call which interrupts Mode 2 Alarm procedure 1800, a user must still enter the appropriate disarming code to prevent a security breach report call from being placed to service 28. After task 1606, 911_Keyed procedure 1600 suspends operation and program control returns to executive 900. The next invocation of procedure 1600 will occur when the next 911 call is placed through CMR 12 and will cause program control to perform task 1602, discussed above.

A Mode 1 type of alarm occurs as a result of activating vehicle alarm signal 54 (see FIGS. 3-4), which is supplied from alarm system 26 (see FIGS. 1-2). This signal is detected in Vehicle Alarm Interrupt routine 800 (see FIG. 8) and debounced through operation of background application procedure 1300 (see FIG. 13). Procedure 1300 sets the Vehicle_Alarm CF after debouncing this activation event. In addition, FCMD procedure 1400 (see FIG. 14) detects key-presses that enable or disable the Mode 1 Alarm procedure and sets the Mode_1_Enable CF accordingly. Thus, when the Mode_1_Enable CF and the Vehicle_Alarm CF are set, executive 900 invokes Mode 1 Alarm procedure 1700 (see FIG. 9).

FIG. 17 shows a flow chart of Mode 1 Alarm procedure 1700. With reference to FIG. 17, a task 1702 resets the Vehicle_Alarm CF and sets the Alarm_Mode flag to indicate a Mode 1 type of alarm. The setting of the Alarm_Mode flag indicates that CMR 12 is now processing a security breach condition. As discussed above in connection with FCMD procedure 1400 (see FIG. 14), this prevents changing the disarming code, and prevents messages (other than a 911 call) from reaching TRU 62. In addition, the setting of the Alarm_Mode flag causes RCMD procedure 1500 (see FIG. 15) to refrain from passing messages to CU 42. Accordingly, CMR 12 appears to be inoperative to a user.

Next, an inquiry task 1704 determines whether the Ign_Status flag describes an ignition "on" state for vehicle 14 (see FIG. 1). When ignition is "on", no service breach report calls for Mode 1 alarms are placed to service 28 (see FIG. 1). Thus, program control proceeds from task 1704 to a task 1706, which modifies the Alarm_Mode flag to indicate that Mode 1 alarms are not being processed. After task 1706, procedure 1700 suspends operation and program control is routed back to executive 900 (see FIG. 9). The next time executive 900 invokes procedure 1700, task 1702 is performed again.

When task 1704 determines that vehicle ignition is in the "off" state, a task 1708 starts an alarm timer for a duration established by a Mode 1 Pre-Call Wait alarm parameter 1212 (see FIG. 12). This alarm parameter has been defined through a remote programming session, as discussed above in connection with FIG. 11. After task 1708, procedure 1700 suspends operations until the alarm timer expires. When executive 900 again invokes procedure 1700, an inquiry task 1710 determines whether vehicle alarm signal 54 (see FIGS. 3-4) is still active. If the alarm signal is not still active, CMR 12 assumes that the alarm was an accident or some other false alarm, and no security breach call is placed to service 28. Thus, when the alarm signal is not still active, procedure 1700 proceeds to task 1706, discussed above.

However, when task 1710 determines that vehicle alarm signal 54 is still active, procedure 1700 calls service 28 to report the security breach condition. The calling of service 28 is performed in a Call Service routine 1900, discussed below in connection with FIG. 19. Using routine 1900, CMR 12 places one or more calls to service 28 in accordance with alarm parameters recorded in memory space 1200 (see FIG. 12) through prior remote programming sessions. After routine 1900, procedure 1700 proceeds to task 1706, discussed above.

A Mode 2 type of alarm occurs as a result of turning vehicle ignition "on". A change in vehicle ignition to an "on" state is detected in background application procedure 1300 (see FIG. 13) and signalled by setting Ign_ Change and Ign_Status CFs. These CFs are associated with Mode 2 Alarm procedure 1800 in data structure 1000 (see FIG. 10). Moreover, FCMD procedure 1400 (see FIG. 14) detects key-presses that enable the Mode 2 Alarm procedure and sets the Mode_2_Enable CF accordingly. And, background application procedure 1300 optionally detects activation of alarm enable signal 55 (see FIGS. 3-4) to enable the Mode_2_Enable CF. Thus, when the Mode_2_Enable CF is set and the vehicle ignition has just switched "on", executive 900 invokes Mode 2 Alarm procedure 1800 (see FIG. 9).

FIG. 18 shows a flow chart of Mode 2 Alarm procedure 1800. With reference to FIG. 18, a task 1802 performs various initializing details. For example, an appropriate display message 1206 (see FIG. 12) is queued for transmission to CU 42. This display message will be displayed at CU 42 to prompt a user to enter the disarming code. In addition, task 1802 sets the Alarm_Mode flag to indicate the processing of a Mode 2 type of alarm. As discussed above, the setting of this flag prevents alteration of the disarming code.

Moreover, task 1802 starts the alarm timer for a duration established by a Mode 2 Pre-Call Wait alarm parameter 1214 (see FIG. 12). This alarm parameter has been defined through a remote programming session, as discussed above in connection with FIG. 11. After task 1802, procedure 1800 suspends operations until the alarm timer expires or until the Disarm_Code CF is set. The Disarm_Code CF may be set in accordance with task 1438, discussed above in connection with FCMD procedure 1400 (see FIG. 14). When executive 900 again invokes procedure 1800, an inquiry task 1804 determines whether the Ign_Status flag now indicates an "on" or "off" condition for the ignition of vehicle 14.

If vehicle ignition is now off, CMR 12 assumes that no genuine security breach condition has occurred, and no security breach report call is placed to service 28 (see FIG. 1). Thus, when task 1804 discovers that vehicle ignition is "off", procedure 1800 performs a task 1806, which modifies the Alarm_Mode flag to indicate that Mode 2 alarms are not being processed. After task 1806, procedure 1800 suspends operation and routes program control back to executive 900 (see FIG. 9). When procedure 1800 suspends operation because task 1804 determines that vehicle ignition has been turned "off", the Mode_2_Enable CF has not been reset. Thus, it remains set, the Mode 2 Alarm procedure remains enabled, and Mode 2 Alarm procedure 1800 will be invoked by executive 900 the next time vehicle ignition is turned "on". The next time executive 900 invokes procedure 1800, task 1802 is performed.

When task 1804 determines that vehicle ignition is still "on", CMR 12 assumes that a genuine security breach condition has occurred. Accordingly, procedure 1800 calls service 28 to report the security breach condition. The calling of service 28 is performed in Call Service routine 1900, discussed below in connection with FIG. 19. Using routine 1900, CMR 12 places one or more calls to service 28 in accordance with alarm parameters recorded in memory space 1200 (see FIG. 12) through prior remote programming sessions. After routine 1900, procedure 1800 proceeds to task 1808. Task 1808 resets the Mode_2_Enable CF to disable the Mode 2 Alarm procedure. Mode 2 Alarm procedure 1800 will not be invoked again the next time vehicle ignition is turned "on", unless the Mode_2_Enable CF is set as discussed above in connection with task 1416 of FCMD procedure 1400 (see FIG. 14) or task 1320 of background application procedure 1300 (see FIG. 13). After task 1808, procedure 1800 proceeds to task 1806, discussed above.

Figure 19:
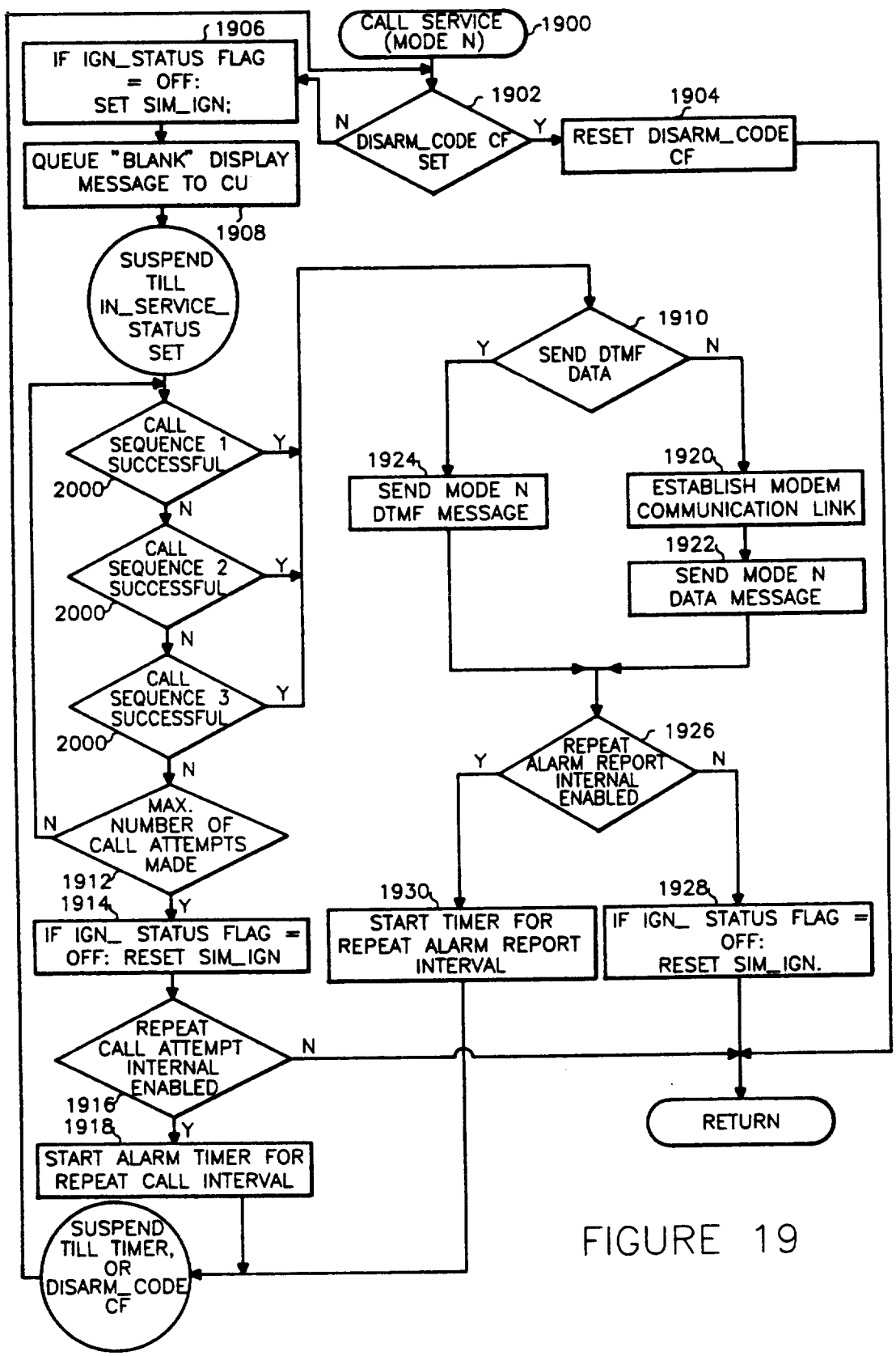
FIG. 19 shows a Call Service routine utilized by the Mode 1 and Mode 2 Alarm procedures of the present invention.

FIG. 19 shows a flow chart of Call Service routine 1900, which is performed by Mode 1 and Mode 2 Alarm procedures 1700 and 1800, respectively, when a genuine security breach condition has been detected. As discussed above, Call Service routine 1900 either makes one or more security breach reports to service 28 or makes call tries as defined in accordance with alarm parameters previously recorded during a remote programming session.

With reference to FIG. 19, an inquiry task 1902 determines whether the Disarm_Code CF is set. The Disarm_Code CF may have been set through FCMD procedure 1400 (see FIG. 14). When the Disarm_Code CF is set, a call is not made to service 28. Thus, routine 1900 proceeds to a task 1904, which resets the Disarm_Code CF, and then returns to the calling procedure.

On the other hand, when the Disarm_Code CF is not set at task 1902, calls are attempted to service 28. Accordingly, routine 1900 proceeds to a task 1906. When vehicle ignition is not "on", task 1906 sets simulated ignition signal 60 (see FIGS. 2≧4) to energize TRU 62 and CU 42. Next, a task 1908 queues a blank display message 1206 (see FIG. 12) for transmission to CU 42. In other words, task 1908 forces CU 42 to display nothing at all. As a result, CMR 12 appears to be de-energized to a user of CMR 12, and the user is generally not aware that CMR 12 is placing a security breach report call.

After task 1908, routine 1900 suspends operation until the In_Service_Status CF is set. As discussed above in connection with RCMD procedure 1500 (see FIG. 15), the In_Service_Status CF indicates that either home or roaming cellular service is available to CMR 12. When program control returns, a Call Sequence inquiry routine 2000 determines whether a first call sequence is successful. If a call is not successfully established, routine 2000 is repeated for second and possibly third call attempts. If any of the three call attempts are successful, routine 1900 proceeds to an inquiry task 1910; and, if all of the three call attempts are unsuccessful, program control proceeds to an inquiry task 1912.

FIG. 20 shows a flow chart of Call Sequence inquiry routine 2000. As shown in FIG. 20, a task 2002 obtains a phone number consistent with a sequence number "n". The first time routine 2000 is performed "n" equals one, the second time "n" equals two, and the third time "n" equals three. In the preferred embodiment, the phone number is obtained by vectoring through first, second, or third call pointers 1216 of memory space 1200 (see FIG. 12). As shown in FIG. 12, pointers 1216 may differ between Mode 1 and Mode 2 alarms. Pointers 1216 identify one of phone numbers 1218 (see FIG. 12), which are the phone numbers of one or more of services 28 (see FIG. 1) and have been recorded by a remote programming session, as discussed above in connection with FIG. 11.

After task 2002, an inquiry task 2004 determines whether the phone number is a valid phone number or a code indicating that no phone number has been recorded. If no valid phone number is detected, then routine 2000 exits and program control returns to routine 1900 (see FIG. 19), declaring the call attempt unsuccessful. When task 2004 detects a valid phone number, a task 2006 queues the phone number's digits for transmission to TRU 62, then queues a simulated "send" message so that TRU 62 will place a call to the phone number.

After task 2006, an inquiry task 2008 determines whether a call is actually established from placing the call. This determination may be made by monitoring control signals supplied by modem 76 (see FIG. 3). When a ring signal is first detected, then absent for a predetermined period of time, such as 5 seconds, task 2008 may conclude that a call has been established. Additionally, task 2008 may conclude that a call has been established if a modem carrier signal is detected. If task 2008 concludes that a call is established, then program control returns to routine 1900 declaring the call attempt as being successful. Task 2008 may conclude that a call is not established when ring is not detected or when a ring is detected and continues for a predetermined number of rings. If task 2008 concludes that a call is not established, then program control returns to routine 1900 declaring the call attempt as being unsuccessful.

Referring back to FIG. 19, when three successive call attempts are not successful, task 1912 inquires whether a maximum number of call attempts have been made to the phone numbers. This inquiry is made by comparing the number of call attempts with an alarm parameter 1220 of memory space 1200 (see FIG. 12) that was recorded during a remote programming session. When the maximum number of permitted call attempts have not yet been reached, routine 1900 loops back to the first use of Call Sequence routine 2000 to again attempt the calls. When routine 1900 eventually reaches the maximum number of unsuccessful call attempts, task 1912 routes program control to a task 1914. Task 1914 resets simulated ignition signal 60 (see FIGS. 2–4) to de-energize TRU 62 and CU 42 if vehicle ignition is "off". This conserves battery power.

After task 1914, an inquiry task 1916 determines whether a repeat call attempt interval is enabled. This determination may be made by examining an alarm parameter 1222 of memory space 1200 (see FIG. 12) that was recorded during a remote programming session. Parameter 1222 may carry a predetermined number, such as zero, to indicate that the interval is disabled. Otherwise, the interval may be assumed to be enabled. When the interval is disabled, Call Service routine 1900 exits and program control returns to the calling procedure 1700 or 1800.

When the interval is enabled, a task 1918 starts the alarm timer for the duration specified by parameter 1222 (see FIG. 12). After task 1918, routine 1900 suspends operation until either the alarm timer expires or until the Disarm_Code CF is set. The next time that executive 900 (see FIG. 9) routes program control to routine 1900, task 1902, discussed above, will be performed.

Accordingly, program control may remain within an indefinite loop within routine 1900 if alarm parameter 1222 (see FIG. 12) is appropriately set. However, the rate at which call attempts are made is determined by alarm parameter 1222. Moreover, this loop is broken when a user enters the Disarm_Code or when a call is successfully placed to one of phone numbers 1218 (see FIG. 12). Furthermore, so long as CMR 12 continues to operate in this loop, the Alarm_Mode flag, discussed above remains set, and CMR 12 cannot be used by the user.

When Call Sequence routine 2000 concludes that a call has been successfully established, inquiry task 1910 determines whether to transmit the security breach report using DTMF tones or using data transmission through modem 76 (see FIG. 3). This determination may be made by examining whether a carrier detect signal is available from modem 76. If such a signal is present, routine 1900 performs a task 1920. Task 1920 establishes a communication link with the called party. Thus, task 1920 may appropriately set a baud rate, and perform security handshaking procedures. After task 1920, a task 1922 transmits an appropriate data message to the called party. This message is preferably defined by alarm parameters 1224 of memory space 1200 (see FIG. 12), which have been recorded by a remote programming session. Parameters 1224 preferably differ depending on whether a Mode 1 alarm, Mode 2 alarm, or both, are being reported. Parameters also include appropriate identifying data so that service 28 may know the precise CMR 12 which is placing the security breach report. Based upon this information, security service 28 may take action to validate the security breach report. Although not shown in FIG. 19, tasks 1920-1922 may take other steps to permit programming CMR 12 or to transmit other data to the called party.

When task 1910 determines that DTMF tones are to be used to transmit the security breach report, a task 1924 constructs an appropriate message from alarm parameters 1226 of memory space 1200 (see FIG. 12), which have been recorded during a remote programming session. Task 1924 then controls DTMF generator 78 (see FIGS. 3-4) to generate DTMF tones in accordance with the message. Such tones may be configured to display a predetermined code on a display pager type of security service 28. Alternatively, such tones may be configured so that distinctive tunes are performed.

After tasks 1922 or 1924, an inquiry task 1926 determines whether a repeat alarm report interval is enabled. This determination may be made by examining an alarm parameter 1228 of memory space 1200 (see FIG. 12) that was recorded during a remote programming session. Parameter 1228 may carry a predetermined number, such as zero, to indicate that the interval is disabled. Otherwise, the interval may be assumed to be enabled. When the interval is disabled, task 1926 routes program control to a task 1928. Task 1928 resets simulated ignition signal 60 (see FIGS. 2-4) to de-energize TRU 62 and CU 42 if vehicle ignition is "off". After task 1928, program control exits routine 1900 and returns to the calling procedure.

When task 1926 determines that the alarm report interval is enabled, a task 1930 starts the alarm timer for the duration specified by parameter 1228 (see FIG. 12). In addition, task 1930 sets the RP_session_CF to cause executive 900 to invoke RP Session procedure 1100 (see FIG. 11) if an incoming remote programming session call is received. After task 1930, routine 1900 suspends operation until either the alarm timer expires or until the Disarm_Code CF is set. The next time that executive 900 (see FIG. 9) routes program control to routine 1900, task 1902, discussed above, will be performed.

Accordingly, program control may remain within an indefinite loop within routine 1900 if alarm parameter 1228 (see FIG. 12) is appropriately set. This indefinite loop will repeatedly make security breach reports to service 28. The interval between such reports is defined by alarm parameter 1228. The repetition of security breach reports may be useful with certain security services 28 in tracing calls through various cells of cellular systems 16 (see FIG. 1) to help locate vehicle 14 (see FIG. 1). In addition, certain vehicle location systems (VLS) 29 (see FIG. 1) may utilize such signals to directly locate a vehicle 14. The repetition of security breach reports continues until this loop is broken. The loop is broken when a user enters the disarming code or when a future-occurring remote programming session alters programming in CMR 12 to break the loop. So long as CMR 12 continues to operate in this loop, the Alarm_Mode flag, discussed above, remains set and CMR 12 cannot be used by the user. Moreover, if vehicle ignition is "on", TRU 62 and CU 42 remain energized so that a potential incoming security callback or remote programming session call may be detected.

In summary, the present invention provides an improved cellular mobile radiotelephone (CMR) that is capable of detecting and reporting security breaches. The CMR of the present invention is remotely programmable. Since it is programmable, it may be standardized for mass production and low cost. Since the CMR of the present invention is remotely programmable, numerous alarm parameters may be reliably specified without user or dealer involvement. Accordingly, the present invention may accommodate a great diversity in adapting individual user needs with the needs of many different types of security services. Moreover, since the CMR of the present invention is remotely programmable, alarm parameters may be periodically and automatically altered to accommodate desired system wide or individual programming changes. Specifically, alarm parameters may be remotely controlled to achieve desired false alarm rates and desired levels of security protection.

The present invention has been described above with reference to a preferred embodiment. However, those skilled in the art will recognize that changes and modifications may be made in this preferred embodiment without departing from the scope of the present invention. For example, the present invention may be adapted for use in connection with portable telephones. In addition, the RPU of the present invention may be incorporated within a TRU. Furthermore, nothing prevents adapting the present invention to incorporate additional capabilities and features. Such additional capabilities and features may further process data passed between a TRU and CU of a CMR. Those skilled in the art will recognize that the various specific tasks and procedures described herein in connection with the preferred embodiment may be altered significantly without departing from the scope of the present invention. These and other changes and modifications which are obvious to those skilled in the art are intended to be included within the scope of the present invention.

What is claimed is:

1. A cellular radiotelephone system for use in a vehicle having an ignition terminal adapted to carry an ignition signal, said system comprising:
   a cellular mobile radiotelephone transmit/receive unit (TRU) for engaging in first and second phone calls;
   remote programming control means, coupled to said TRU, for receiving and recording alarm parameters from said TRU during said first phone call;
   a vehicle alarm system having an output signal which activates to indicate a security breach condition;
   user input means for generating a disarming signal in response to a physical manipulation of said user input means by a user;
   timing control means, coupled to said ignition terminal, for determining a disarming duration which begins substantially at activation of said ignition signal and continues for a period of time established by said alarm parameters; and
   alarm detection control means, coupled to said vehicle alarm system, to said TRU, to said user input means, and to said timing control means, for instructing said TRU to place said second call to a telephone number when said security breach condition occurs, said telephone number being defined by said alarm parameters, and for instructing said TRU to place said second call to said telephone number when said disarming signal is not generated prior to expiration of said disarming duration.

2. A cellular radiotelephone system as claimed in claim 1 wherein said user input means comprises a cellular mobile radiotelephone keypad having a multiplicity of keys, and said disarming signal is generated after said user pressed a predetermined sequence of said keys.

3. A cellular radiotelephone system as claimed in claim 1 additionally comprising:
message control means, coupled to said remote programming control means, for transmitting a predetermined alarm message, said alarm message being defined by said alarm parameters recorded by said remote programming control means, and said transmitting occurring during said second call placed by said TRU; and
means, coupled to said message control means and said TRU, for encoding said alarm message code as dual-tone multifrequency (DTMF) pulses.

4. A cellular radiotelephone system as claimed in claim 1 wherein:
said system additionally comprises second timing control means, coupled to said alarm detection control means, for determining a second disarming duration which begins substantially at activation of said output signal from said vehicle alarm system and continues for a period of time established by said alarm parameters; and
said alarm detection timing control means comprises monitoring means which prevents the placing of said second call when said security breach condition disappears prior to expiration of said second disarming duration.

5. A method of operating a cellular telephone having a keypad for receiving user input, said cellular telephone being installed in a vehicle having a vehicle ignition terminal and a vehicle alarm system, and said method comprising the steps of:
a) receiving one or more programming phone calls which communicate alarm parameters to said cellular telephone, said alarm parameters including data defining a predetermined duration and a telephone number;
b) monitoring said vehicle alarm system to detect an alarm signal which indicates a security breach condition;
c) monitoring said vehicle ignition terminal to determine when vehicle ignition becomes activated;
d) monitoring said keypad to determine whether a predetermined sequence of keys from said keypad is activated;
e) monitoring time to determine when said predetermined duration transpires after activation of said vehicle ignition; and
f) placing a call to said telephone number when said predetermined duration transpires prior to determining said predetermined sequence at said keypad or when said alarm signal is detected.

6. A method as claimed in claim 5 additionally comprising, when said step b) detects said alarm signal, the steps of:
g) monitoring said vehicle alarm system for an end to said security breach condition, said step g) occurring during a disarming duration which begins substantially with activation of said alarm signal, and said disarming duration being established by said data obtained in said step a); and
h) if said step g) detects an end to said security breach condition prior to the expiration of said disarming duration, refraining from performing said placing step.

7. A method as claimed in claim 5 additionally comprising the step of transmitting, during said call, a predetermined alarm message, said alarm message being defined by said data obtained in said receiving step.

8. A method as claimed in claim 7 additionally comprising the step of encoding said alarm message as a dual-tone multifrequency (DTMF) signal.

9. A method as claimed in claim 5 wherein said method additionally comprises the steps of:
monitoring key-presses entered at said keypad for a predetermined alarm operation code;
recording data indicating the detection of said alarm operation code;
prior to said step f), examining said recorded data to determine one of an enabled or a disabled state for alarm operation; and
refraining from performing said step f) when said examining step detects a disabled state for alarm operation.

10. A method as claimed in claim 5 additionally comprising the steps of:
determining whether said step f) establishes a call; and
when said step f) does not establish a call, placing a second radiotelephone call to one of said telephone number and a second telephone number, said second telephone number being defined by said data obtained in said step a).

11. A method as claimed in claim 10 additionally comprising the steps of:
selecting between said telephone number and said second telephone number in accordance with selection data obtained in said step a); and
when said selecting step chooses said telephone number, waiting a repetition duration before placing said second radiotelephone call, said repetition duration being defined by data obtained in said step a).

12. A method as claimed in claim 5 wherein said cellular telephone has a transmit/receive unit (TRU) with a TRU ignition terminal, and said method additionally comprises, when said step b) detects said alarm signal, the step of activating a TRU ignition signal supplied to said TRU ignition terminal prior to said step f).

* * * * *